(12) United States Patent
Wells et al.

(10) Patent No.: US 12,499,977 B2
(45) Date of Patent: Dec. 16, 2025

(54) SYSTEM AND METHOD FOR ELECTRONIC MEDICAL RECORD GENERATION, ACCESS, AND AUDIT

(71) Applicant: INTELLITEK HOLDINGS CO., Kirkland, WA (US)

(72) Inventors: Andrew Alan Wells, Madeira Beach, FL (US); Martyn Molnar, Street (GB); Alkarim Al Lalji, Bothell, WA (US)

(73) Assignee: INTELLITEK HOLDINGS CO., Kirkland, WA (US)

( * ) Notice: Subject to any disclaimer, the term of this patent is extended or adjusted under 35 U.S.C. 154(b) by 224 days.

(21) Appl. No.: 17/881,454

(22) Filed: Aug. 4, 2022

(65) Prior Publication Data

US 2023/0045273 A1    Feb. 9, 2023

Related U.S. Application Data

(60) Provisional application No. 63/230,055, filed on Aug. 5, 2021.

(51) Int. Cl.
*G16H 10/60* (2018.01)
*G16H 15/00* (2018.01)
*G16H 40/20* (2018.01)

(52) U.S. Cl.
CPC .............. *G16H 10/60* (2018.01); *G16H 15/00* (2018.01); *G16H 40/20* (2018.01)

(58) Field of Classification Search
None
See application file for complete search history.

(56) References Cited

U.S. PATENT DOCUMENTS

| | | | | |
|---|---|---|---|---|
| 10,971,264 | B1* | 4/2021 | Dudzinski | G16H 40/20 |
| 10,997,405 | B1* | 5/2021 | Lam | G06N 3/084 |
| 11,978,558 | B1* | 5/2024 | Drakos | G16H 50/70 |
| 12,020,814 | B1* | 6/2024 | McNair | G16H 50/70 |
| 2013/0093829 | A1* | 4/2013 | Rosenblatt | H04N 7/18 434/365 |
| 2015/0347599 | A1* | 12/2015 | McMains | G06F 16/24522 707/723 |
| 2017/0169191 | A1* | 6/2017 | Bowers | G16H 10/60 |
| 2018/0053128 | A1 | 2/2018 | Costas | |
| 2018/0294048 | A1* | 10/2018 | Blumenthal | G16H 10/60 |
| 2018/0315499 | A1 | 11/2018 | Appelbaum et al. | |
| 2018/0358117 | A1* | 12/2018 | Neagle | A61B 5/0015 |

(Continued)

OTHER PUBLICATIONS

Mittal et al., Web-based chatbot for Frequently Asked Queries (FAQ) in Hospitals, Journal of Taibah University Medical Sciences (2021) 16(5), 740e746.*

(Continued)

*Primary Examiner* — David J Stoltenberg
(74) *Attorney, Agent, or Firm* — Krista A. Wittman

(57) ABSTRACT

A system and method for medical audit is provided. Modules each regarding a different patient status are maintained. A chatbot is activated and a status of a patient is received. One of the modules for the patient is selected based on the patient status. Requests for information are provided to the patient based on the selected module and information from the patient is received in response to the requests. The information is checked for compliance with a set of standards selected for the information and the patient is notified that the information does not comply.

18 Claims, 28 Drawing Sheets

(56) References Cited

U.S. PATENT DOCUMENTS

| | | | | |
|---|---|---|---|---|
| 2019/0180862 | A1* | 6/2019 | Wisser | G16H 30/40 |
| 2019/0311807 | A1* | 10/2019 | Kannan | G16H 10/60 |
| 2019/0347387 | A1* | 11/2019 | Woodward | G16H 15/00 |
| 2020/0020425 | A1* | 1/2020 | Qu | G06Q 40/08 |
| 2020/0394738 | A1* | 12/2020 | Nichols | G06F 3/011 |
| 2021/0058513 | A1 | 2/2021 | McNeil et al. | |
| 2021/0287783 | A1* | 9/2021 | Jhaveri | G16H 80/00 |
| 2021/0295987 | A1* | 9/2021 | Thomas | G16H 40/20 |
| 2023/0047438 | A1* | 2/2023 | Gudesblatt | G16H 80/00 |

OTHER PUBLICATIONS

Wongpatikaseree et al., Daily Health Monitoring Chatbot with Linear Regression, 2020 15th International Joint Symposium on Artificial Intelligence and Natural Language Processing (iSAI-NLP) | 978-1-6654-1554-5/20/$31.00 © 2020 IEEE | DOI: 10.1109/iSAI-NLP51646.2020.9376822.*

Polignano et al., HealthAssistantBot: A Personal Health Assistant for the Italian Language, Digital Object Identifier 10.1109/ACCESS.2020.3000815.*

Bhatt et al. DocPal: A Voice-based EHR Assistant for Health Practitioners, 2020 IEEE International Conference on E-health Networking, Application & Services (HEALTHCOM).*

Purohit Soumya et al: "HonestChain: Consortium blockchain for protected data sharing in health information systems", Peer-to-Peer Networking and Applications, Springer, US, vol. 14, No. 5, May 3, 2021 (May 3, 2021), pp. 3012-3028, XP037542618, ISSN: 1936-6442, DOI: 10.1007/S12083-021-01153-Y [retrieved on May 3, 2021].

Ahmed Fadhil et al: "Designing for Health Chatbots", arxiv.org, Cornell University Library, 201 Olin Library Cornell University Ithaca, NY 14853, Feb. 24, 2019 (Feb. 24, 2019), XP081032763.

* cited by examiner

30

40

80

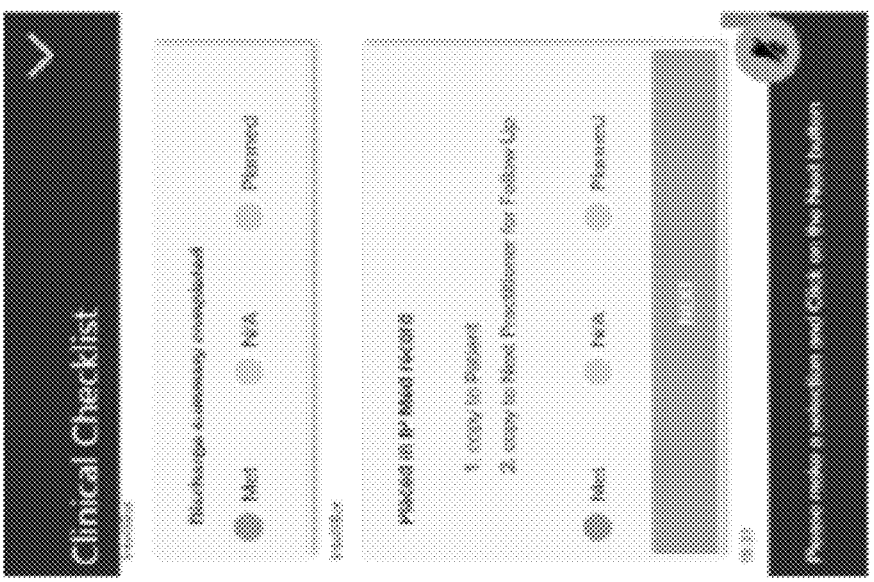
Fig. 11P  Fig. 11Q  Fig. 11R
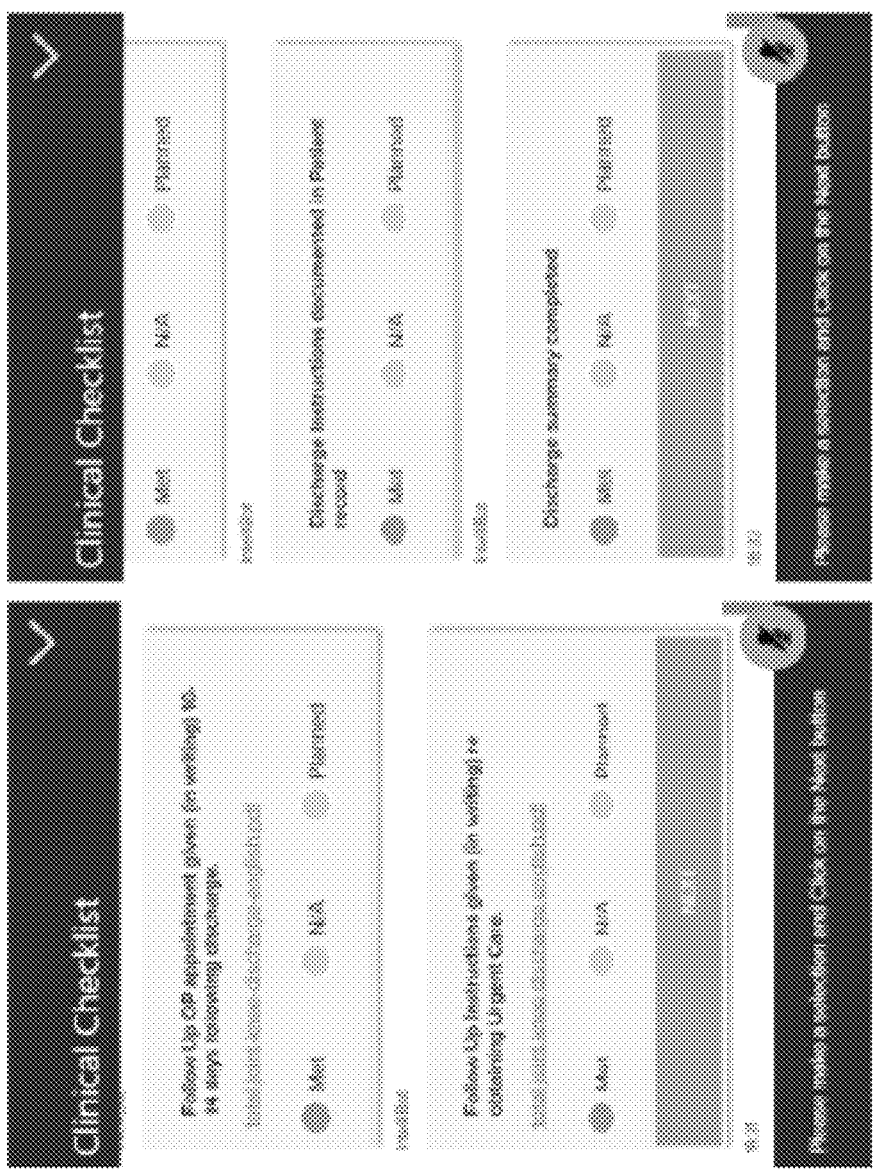

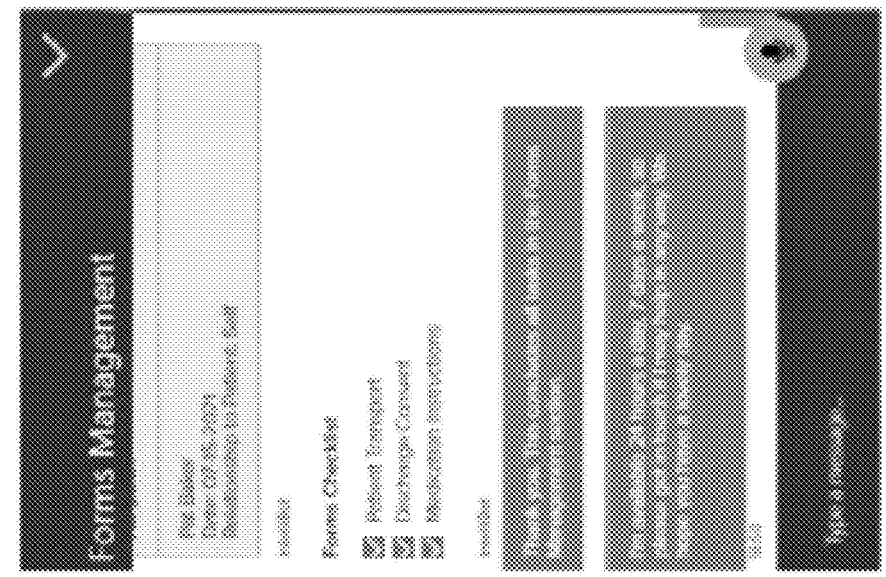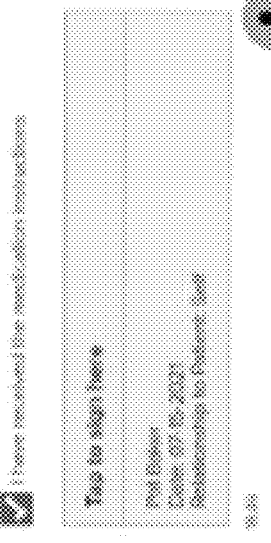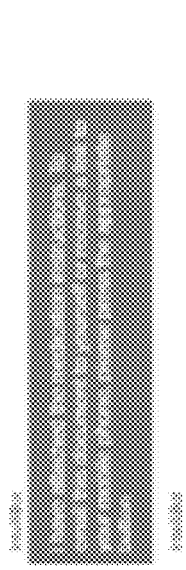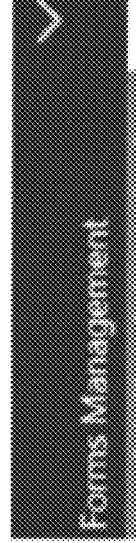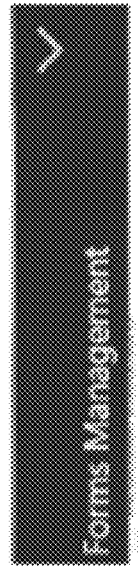
Fig. 12G  Fig. 12H  Fig. 12I

SYSTEM AND METHOD FOR ELECTRONIC MEDICAL RECORD GENERATION, ACCESS, AND AUDIT

FIELD

This invention relates in general to electronic records, and in particular to a system and method for electronic medical record generation, access, and audit.

BACKGROUND

Ensuring that hospitals and other medical facilities follow proper medical protocol is extremely important to instill confidence in the care provided and protect patient safety. An accreditation system is one way to signal that a healthcare organization is qualified to provide high quality care. In the U.S., government funded programs, whether state or federal, offer healthcare to qualifying individuals. Such programs can include Medicare and Medicaid in the U.S., as well as other federal and state programs. However, only approved healthcare organizations are allowed to accept patients under such programs. The approved healthcare organizations must meet eligibility requirements established by the appropriate governmental entity to receive reimbursement under the program.

The Joint Commission in the United States and the Joint Commission International, along with other accreditation systems, were established to monitor and accredit healthcare organizations, and allow healthcare organizations to prove that they are in compliance with the eligibility requirements established for participating in governmental programs. Each of The Joint Commission and the Joint Commission International establish standards that a healthcare organization must meet to receive accreditation. The standards are based on the eligibility requirements established by a particular governmental organization for which the healthcare organization must be accredited.

To receive accreditation, the Joint Commission International performs an audit of a healthcare organization every three years, during which the organization must be able to satisfy the standards established. Currently, many audits are performed manually, including reviewing manual records and notes taken for patients and can require days or even weeks to complete. The audits can be an extreme cost for most healthcare organizations due time spent by employees on procuring required information and potential lack of staffing during this time. Some audits can be performed using a combination of digital and manual review; however, much time and expense is still required.

Accordingly, automatically obtaining information from patients consistent and in compliance with accreditation standards for real-time audit is needed to reduce the amount of time and money spent by healthcare organizations for accreditation. Preferably, such audit is based on electronic records that are generated and maintained with information from patients obtained via a conversational engine, such as a chatbot.

SUMMARY

An embodiment provides a system and method for electronic medical record generation, access, and audit. A conversational engine is utilized to obtain information from and regarding a patient. The conversational engine utilizes different modules, which are each associated with information requests based on a particular stage or topic of healthcare. In one embodiment, the modules can be related to a patient status or condition. Information received regarding the patient is stored in a digital patient record. Audits of the data can be performed on the digital records for groups of patients to ensure compliance with one or more sets of standards, such as associated with an accreditation organizations. Further, a compliance indicator can be determined continuously to indicate whether a healthcare organization is in compliance on an ongoing basis.

A further embodiment provides a system and method for medical audit. Modules each regarding a different patient status are maintained. A chatbot is activated and a status of a patient is received. One of the modules for the patient is selected based on the patient status. Requests for information are provided to the patient based on the selected module and information from the patient is received in response to the requests. The information is checked for compliance with a set of standards selected for the information and the patient is notified that the information does not com Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIGS. 12A-I are screenshots showing, by way of example, communication between a chatbot and patient based on a patient education module.

DETAILED DESCRIPTION

To increase patient confidence and ensure patient safety, hospitals and other healthcare facilities, such as nursing homes and rehabilitation centers, are audited to obtain accreditation. Accredited facilities are often seen as more trustworthy and capable of providing better care, as well as qualifying to accept patients for care funded by governmental entities, including federal or state programs. However, the audit process can be time consuming and associated with a high cost, both financially and with regards to staff support. Further, due to the time spent and cost, audits are only performed on a schedule and unless a healthcare organization has its own audit process in place, the organization does not know if they are in compliance with the standards of the accreditation system. Collecting information via a conversational engine that utilizes workflows configured to standards of an accreditation organization can be used to perform real-time auditing, which allows an organization to determine whether they are in compliance with the accreditation standards at any time, as well as decreasing the time and cost of a conventional audit.

Figure 1:
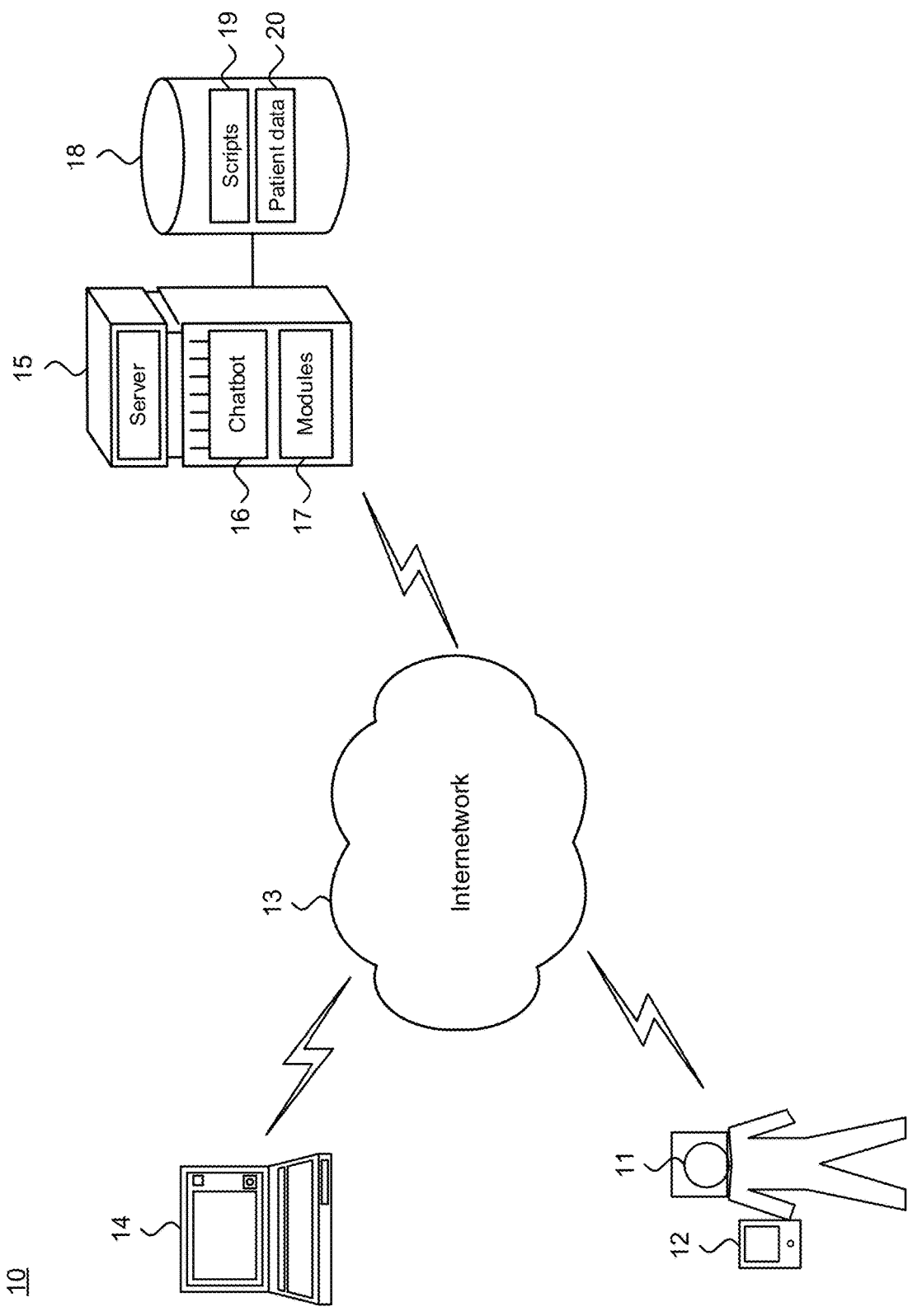
FIG. 1 is a block diagram showing a system for electronic medical record generation, access, and audit, in accordance with one embodiment.

Compliance with medical standards for accreditation can require a healthcare organization to obtain and maintain particular types of data from a patient. Collecting such data automatically, such as via a conversational engine, including a chatbot, allows the data to be electronically stored and audited at any time. FIG. 1 is a block diagram showing a system 10 for electronic medical record generation, access, and audit, in accordance with one embodiment. A patient 11 entering or within a healthcare facility, such as a hospital, nursing home, or rehabilitation facility is identified as being at a particular stage or status within the healthcare facility, including registration, admission, and discharge. Other stages are possible, as further discussed below with respect to FIG. 4. In one embodiment, the patient 11 is associated with a mobile computing device 12, such as a mobile smartphone, tablet, smartwatch, Google glass or other type of computing device. In a further embodiment, the patient can also be associated with a tracking device (not shown) to track a location of the patient within the healthcare facility. A location of the patient, as determined by the mobile computing device 12 or location tracking device (not shown), can be provided to a server 15 via an internetwork 13, such as the Internet and stored in a database 18 associated with the server 15. In a further embodiment, one or more servers and databases can be accessed through a cloud platform.

The server 15 includes a conversational engine 16, such as a chatbot, and modules 17 that can be incorporated into the chatbot 16. The chatbot is a program that simulates human conversation via an electronic device. For example, an individual can interact via a cellular telephone with a chatbot, which provides text or audio dialog to the individual and to which the individual responds. Each of the modules 17 utilized by the chatbot is a computer program or procedure written as source code in a conventional programming language that can be presented for execution by the central processing unit of the server as object or byte code. The server 15 can utilize the location itself or with information from a medical record 20 for the patient to identify a module 17 for use by the chatbot 16. The chatbot 16 can obtain and execute scripts 19 or voice recordings associated with the identified module. Each script or voice recording snippet can be provided to the patient as text, such as displayed on the mobile computing device 12, or as audio, and can include one or more questions focused on a particular topic or subject matter area regarding information to obtain from the patient. The scripts and voice recordings are stored in the database 18, along with responses to the questions received from the patient.

Figure 2:
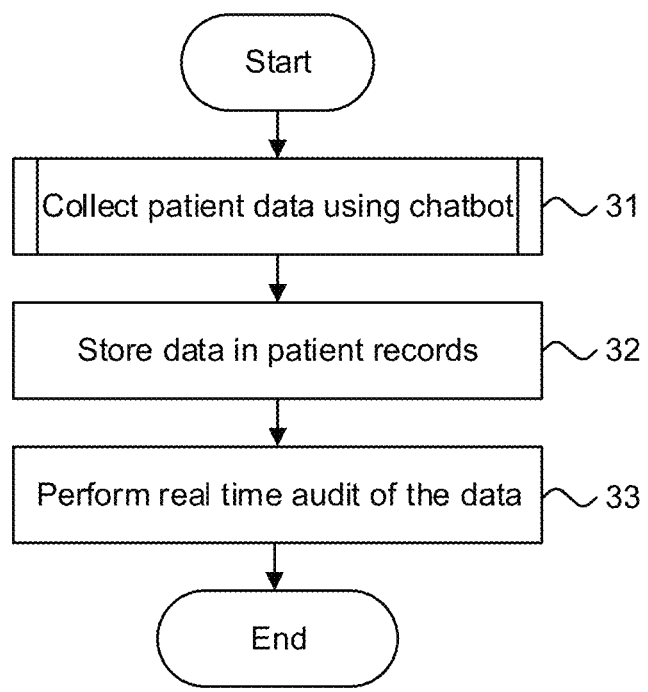
FIG. 2 is a flow diagram showing a method for electronic medical record generation, access, and audit, in accordance with one embodiment.

Patient data obtained via a conversational engine utilizing workflows configured to identified medical standards can be stored in electronic medical records and used for real-time audits of the data. FIG. 2 is a flow diagram showing a method 30 for electronic medical record generation, access, and audit, in accordance with one embodiment. Data is collected (step 31) from a patient using a conversational engine. Collecting the data is further discussed below in detail with respect to FIG. 3. The collected data is stored (step 32) in an electronic medical record for the patient. At any time, an audit of the electronic records can be performed to determine whether the facility in which the patient is being treated is in compliance with accreditation standards of an authorized accreditation organization. For example, the patient data in the record can be grouped or obtained based on facility prior to performing the audit for that facility. Performing the audit is further discussed below in detail with respect to FIG. 5.

Figure 3:
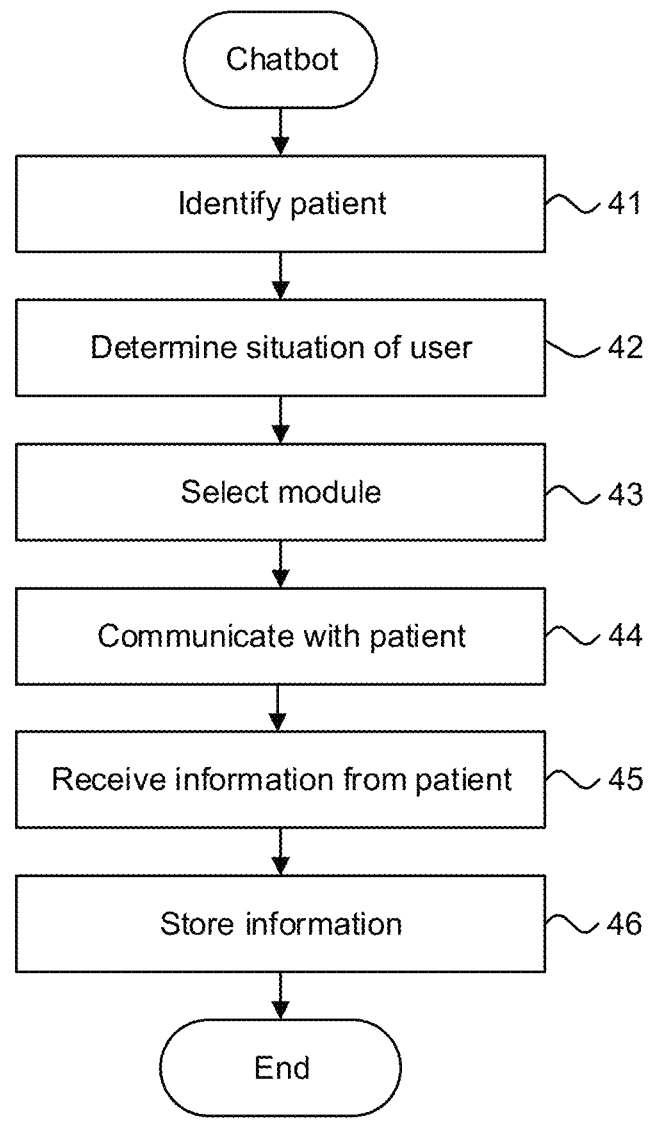
FIG. 3 is a flow diagram showing, by way of example, a process for obtaining information from a patient via a chatbot.

A real-time audit can be performed using electronic records. Conventionally, healthcare professionals either manually write or type notes regarding the patient; however, conversational engines can be used to obtain patient information automatically. The use of conversational engines can dramatically reduce staff time and cost, as well as prevent errors in notetaking, while ensuring that all relevant information is obtained. FIG. 3 is a flow diagram showing, by way of example, a process 40 for obtaining information from a patient or healthcare professional via a chatbot. A patient is identified (step 41) and an electronic medical record of the patient can be accessed. If no patient record exists, a new medical record can be generated for the patient. Further, a location of the patient can be identified. A situation of the patient or stage within the healthcare facility is determined (step 42) based on the patient record and location. For example, if no patient record has been generated, the patient is likely entering the healthcare facility for the first time. However, if the patient's location indicates that the patient is located within one of the patient rooms in the healthcare facility and the patient has been discharged according to the record, the patient is likely getting ready to leave the healthcare facility.

Based on the situation or stage of the patient within the healthcare process in the facility, a chatbot module can be selected (step 43). Returning to the examples above, the module for the patient with no medical record can include a registration module, while a discharge module may be selected for the patient already within the healthcare facility. The modules are further discussed below with respect to FIG. 4.

The chatbot utilizes the module to communicate (step 44) with the patient or healthcare professional in charge of the patient by providing scripted dialog to the patient based on the module selected. The dialog can include instructions and questions for the patient as prompts for obtaining information. For example, the new patient module can include questions to obtain information for generating a patient record, such as "please enter two forms of identification" and "what is your emergency contact information?" and "what is your insurance information?" Other types of questions are possible. The discharge module can include instructions and questions directed to a healthcare professional associated with the patient being discharged including "please enter follow up appointment date and time" and "please complete discharge checklist." Additionally, the module can include instructions and questions directed to the patient, such as "please rate your experience at the healthcare facility" and "please provide feedback." Information is received (step 45) from the patient or healthcare professional in response to the scripted requests for information and stored (step 46) in the patient's record.

Figure 4:
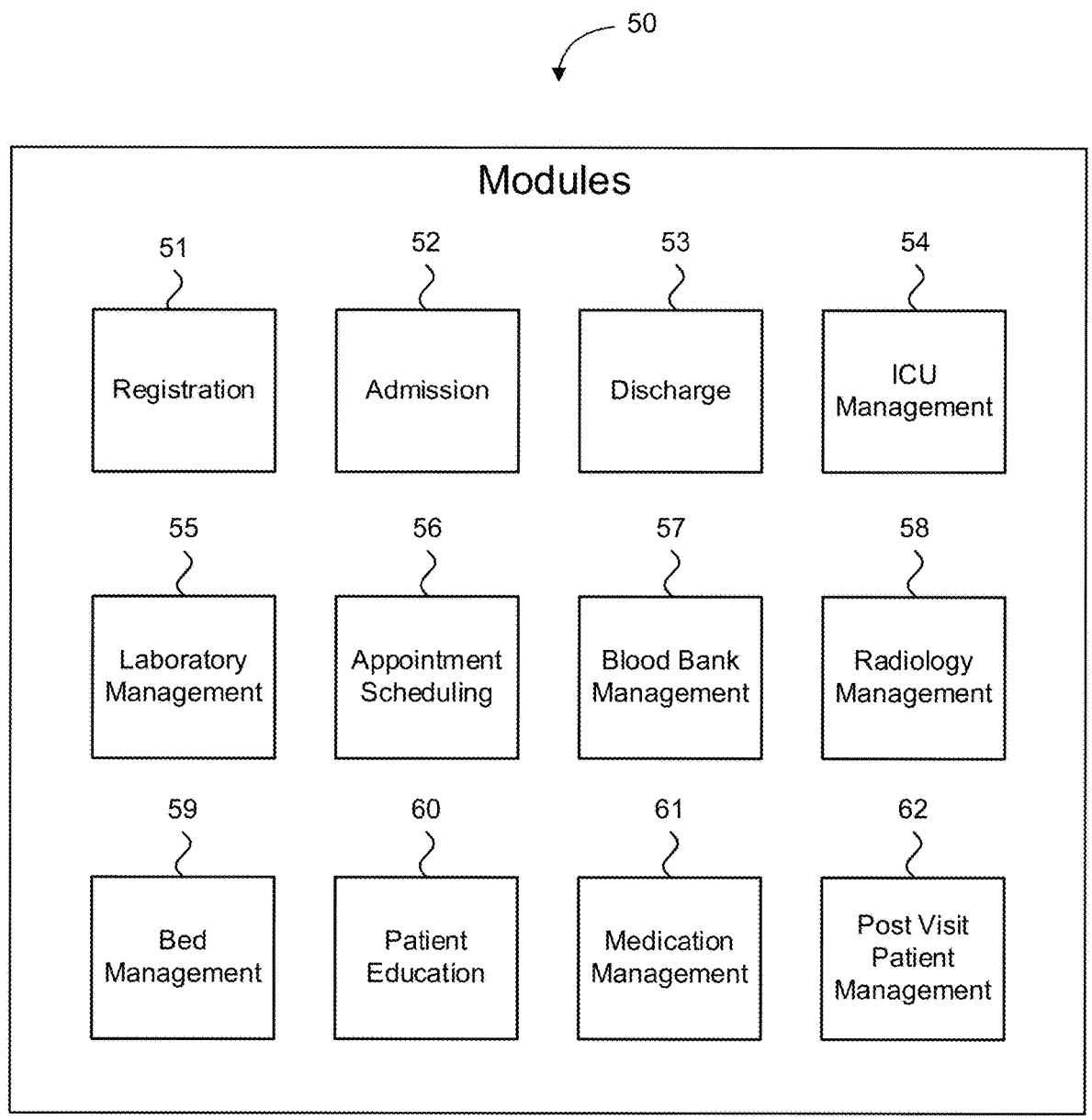
FIG. 4 is a block diagram showing, by way of example, modules for selection and use by a chatbot.

Each chatbot module provides scripted dialog for obtaining information based on a predetermined topic or focus area. FIG. 4 is a block diagram showing, by way of example, modules 50 for selection and use by a chatbot. The modules can include a registration module 51, admission module 52, discharge module 53, ICU management 54, laboratory management 55, appointment scheduling 56, blood bank management 57, radiology management 58, bed management 59, patient education 60, medication management 61, and post visit patient management 62. However, other modules are possible, including audit trail management, dashboard management, clinical checklist management, predictive analytics, consent management, administrative management, interdisciplinary management, shift handover, inventory manager, forms management, home care management, pharmacy management, nursing station management, emergency management, pre-operative management, access and transfer service, self-triage, intra-operative management, CSSI management, physiotherapy/rehab management, post-op management, diet management, and feedback management, as well as other modules. In one embodiment, each of the modules can be configured as software written around a set of procedures or standards established by an organization, such as the Joint Commission International or The Joint Commission, which are both accreditation organizations.

The modules can be selected for providing to a patient based on the patient's location or identified situation, such as determined from the patient's medical record, or by asking questions of the patient once the patient opens an application associated with the chatbot and real time audit. An overrider determines, based on information, provided by the patient, which module is appropriate for providing to the patient for obtaining necessary data. For example, a patient entering a hospital can open up the application to answer questions about why the patient is at the hospital. If the patient is present for day surgery, the chatbot can select a module for hospital registration and obtain all necessary information from the patient prior to being admitted. The chatbot and audit service can also be accessed via a social media page, such as Facebook, a web chat, as well as other mediums. The chatbot can communicate with the patient via text or audio.

Figure 5:
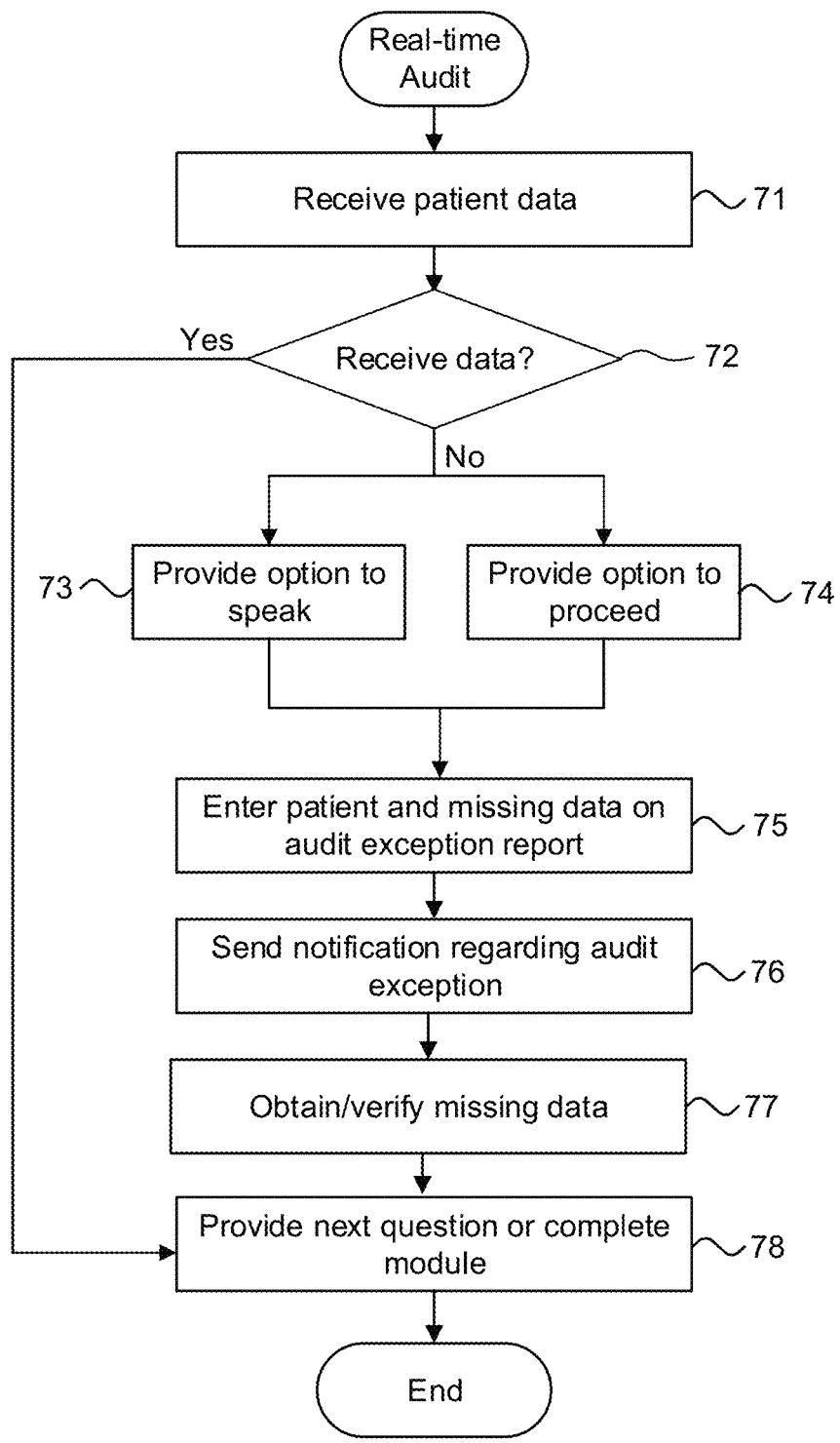
FIG. 5 is a flow diagram showing, by way of example, a process for performing real-time audit compliance checking.

As a module is run and data is requested from a patient based on the running module, an audit is performed in real time. FIG. 5 is a flow diagram showing, by way of example, a process 70 for performing real-time audit compliance checking. A question in a module, selected for a patient, is provided (step 71) via a chat bot. If an answer is not provided (step 72) by the patient, the chat bot can try again to obtain the information, as well as provide (step 73) an option for the patient to speak with a medical professional or administrative assistant, or an option to continue (step 74) through a script associated with the module.

When information requested of the patient is not provided, the patient's name and type of information not provided is placed (step 75) on an audit compliance report. The audit compliance is a running list of patients and types of data missing for those patients. An alert can optionally be provided (step 76) to a medical professional or administrator regarding placement of the patient on the audit compliance report in an attempt to obtain the information. Further, the missing data can be obtained (step 77), while the module is running or after the module has terminated, and added to a record for the patient. Finally, if the module is still running despite not obtaining the requested data, the next dialog in the script is provided (step 78) to the patient.

Figure 6:
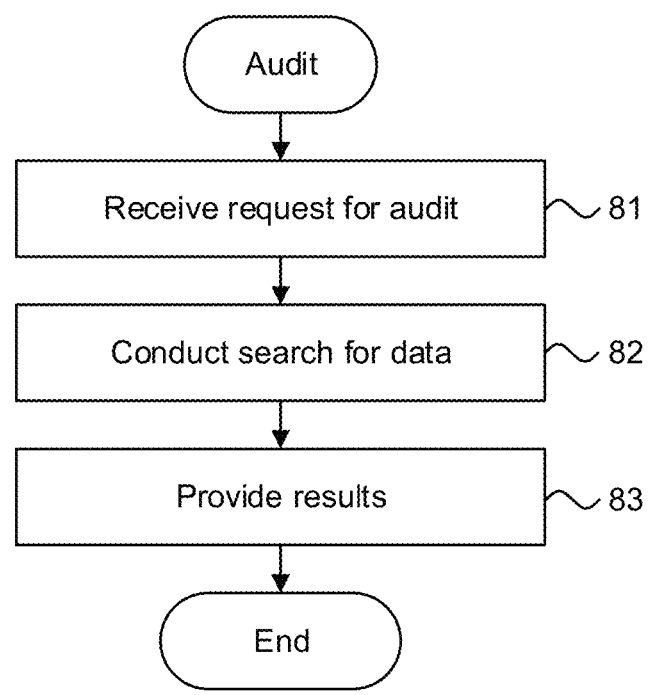
FIG. 6 is a flow diagram showing, by way of example, a process for performing an audit on request.
Figure 7B:
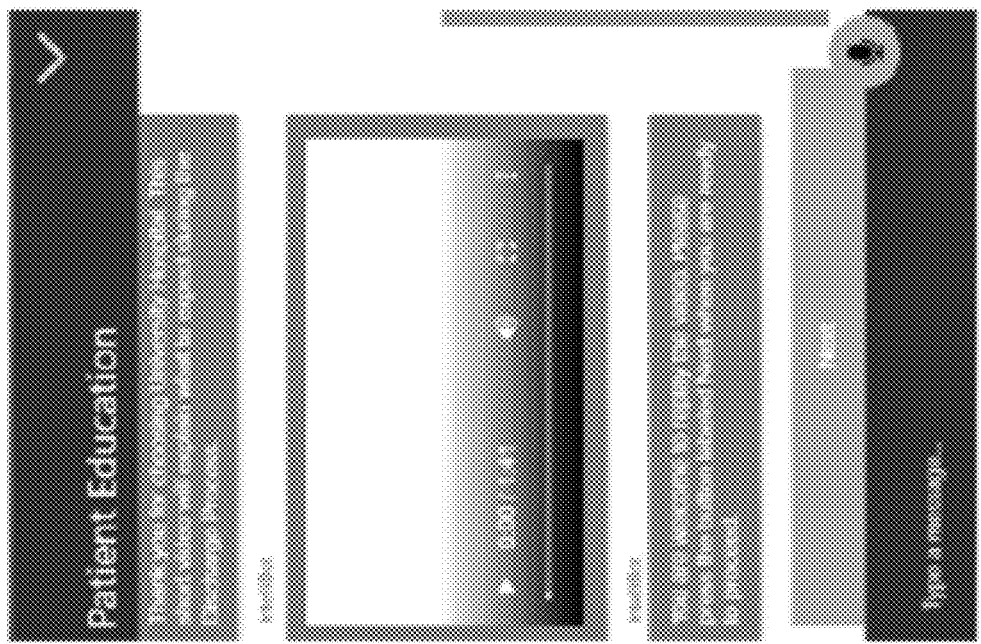
FIGS. 7A-E are screenshots showing, by way of example, communication between a chatbot and patient based on a patient education module.
Figure 7A:
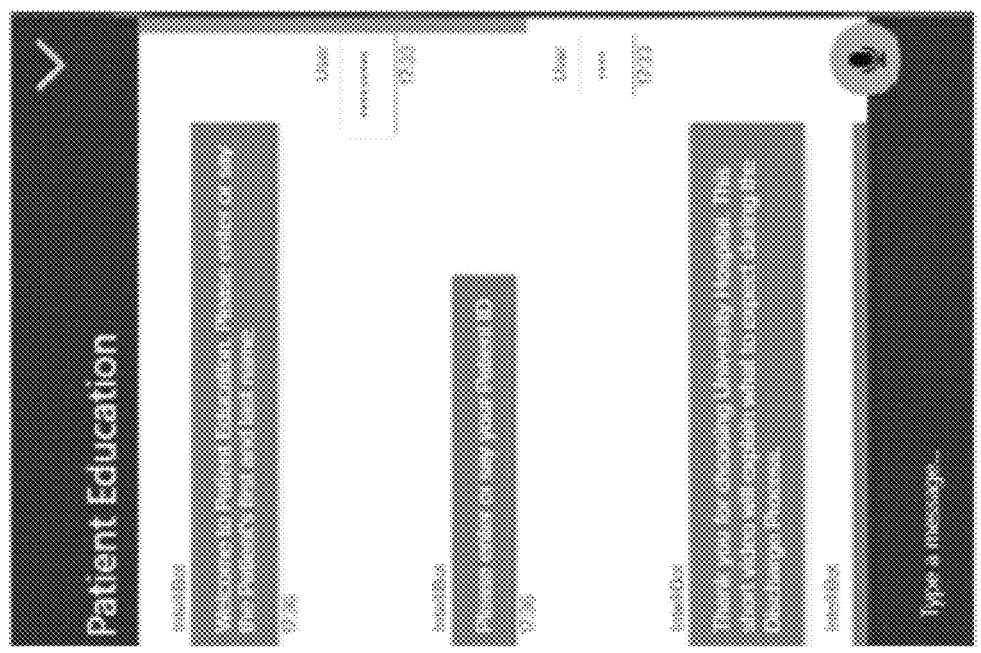
Figure 7C:
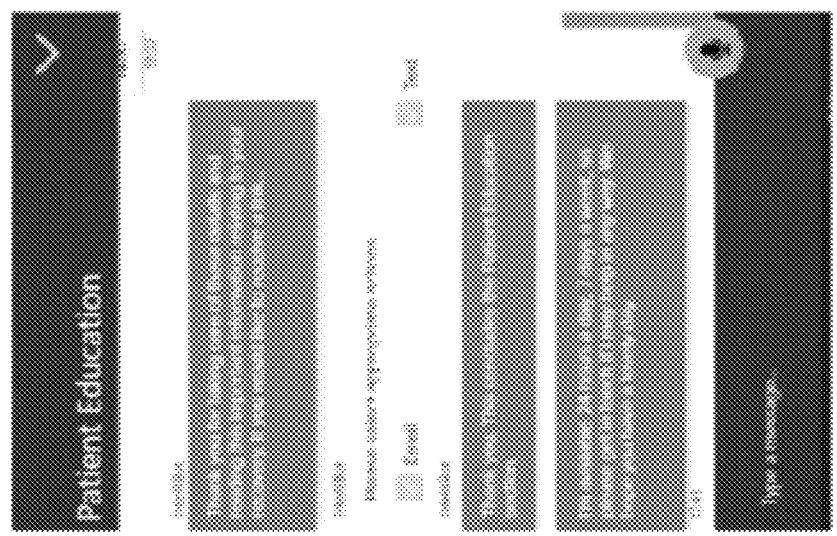
Figure 7D:
Figure 7E:
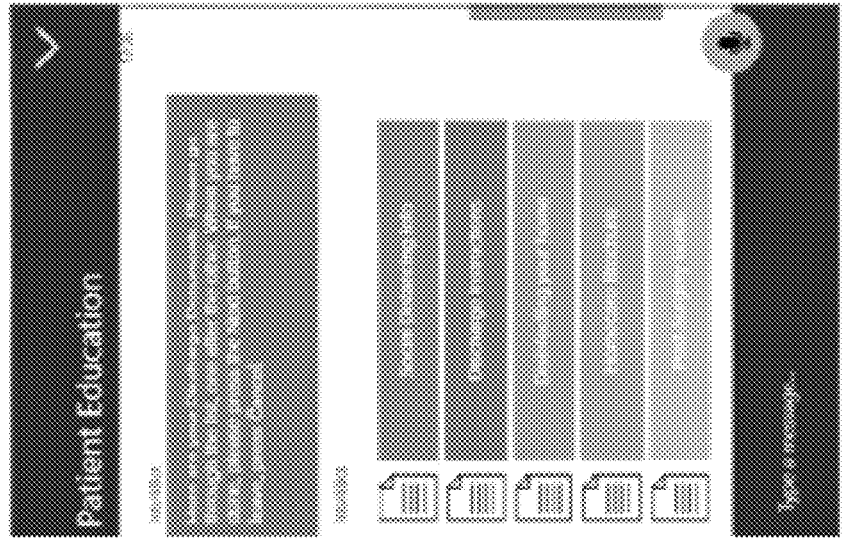

Utilizing modules that focus on the procedures or standards of an accreditation organization help ensure that a healthcare organization collects necessary data to remain in compliance with the accreditation organization and allows for real-time audit to ensure compliance. FIG. 6 is a flow diagram showing, by way of example, a process 80 for performing an audit on request. A request for an audit is received (step 81) from a healthcare professional or an individual from an accreditation organization via a conversational dashboard. The request can include a report of all compliance for a particular factor across all medical records at the healthcare organization or for one or more individual patients. A search for the requested data is conducted (step 82) and results can be provided (step 83) to the requesting party. The results can be analyzed automatically or by the requesting party to determine whether the healthcare organization is in compliance for the particular factors, such as patient registration or identification confirmation.

The dashboard can provide an indicator of a compliance status of the healthcare organization. The indicator can include a green compliance indicator or a red non-compliance indicator. Other types of indicators are possible. Further, automatic data checks and audits can be performed. For example, as data is provided by a user, such as a patient or healthcare professional, a data check can be performed to determine whether the correct information is being provided, as well as whether any data from the patient or healthcare professional is missing. For example, a new patient may be asked by the chatbot to provide two forms of identification. If only one form is provide, an alert may be sent to the patient or to an administrator at the hospital to ensure the second form of identification is obtained, such as in compliance with TJC or JCI. Further, an audit can be performed automatically at predetermined times to ensure compliance by the healthcare organization, rather than waiting until the audit is performed by the accreditation organization. For example, a series of checks can be performed on data maintained for one or more individuals to ensure compliance.

Figure 8C:
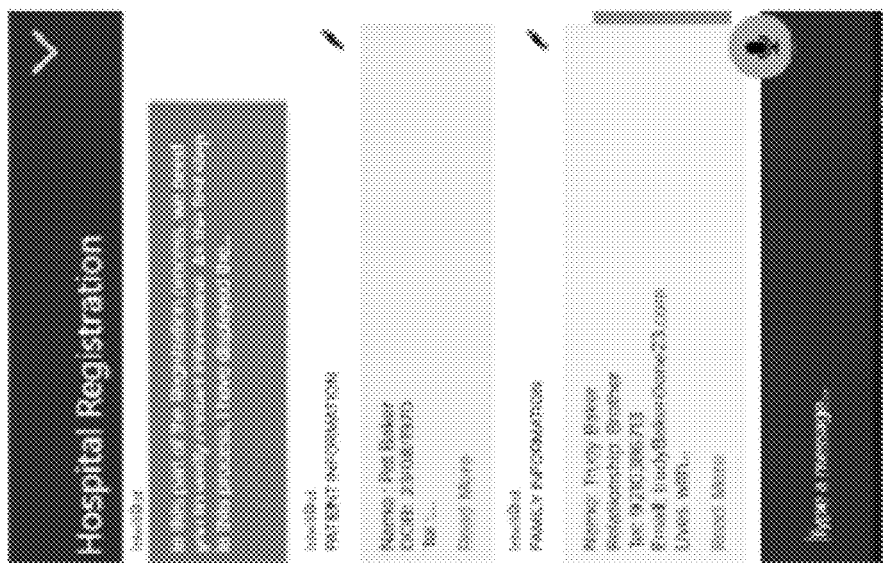
FIGS. 8A-P are screenshots showing, by way of example, communication between a chatbot and patient based on a patient registration module.
Figure 8B:
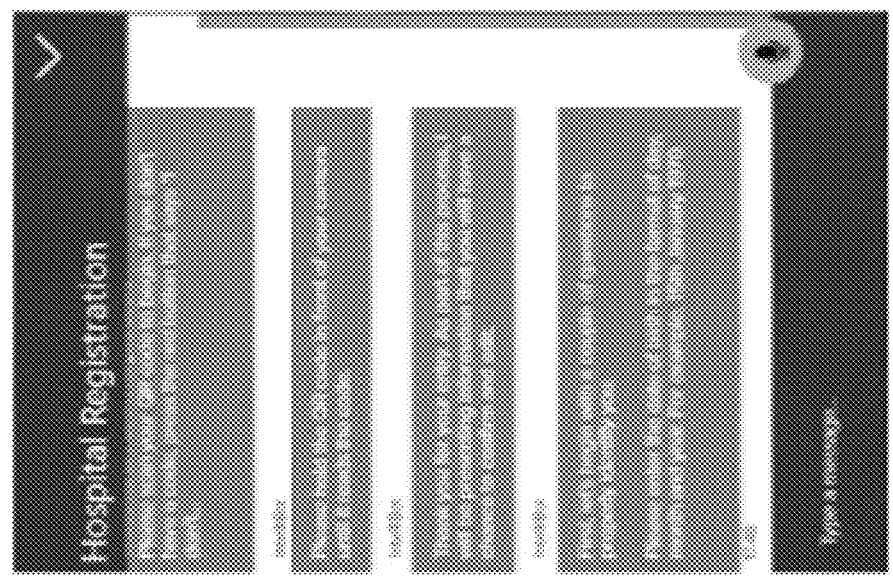
Figure 8A:
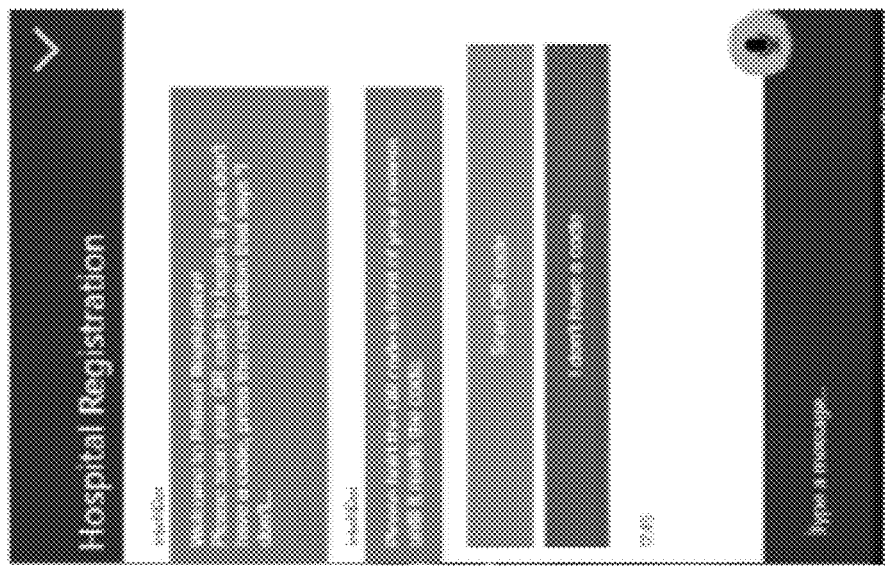
Figure 8D:
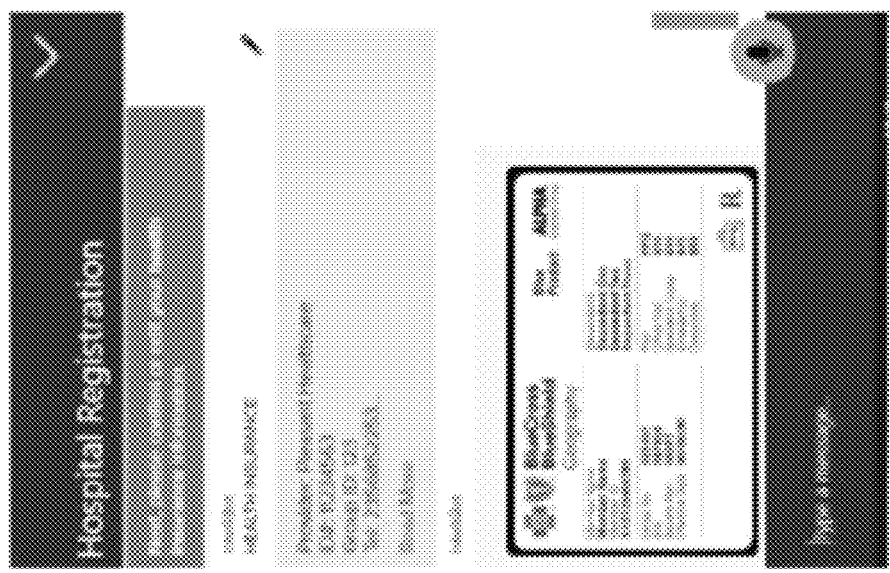
Figure 8E:
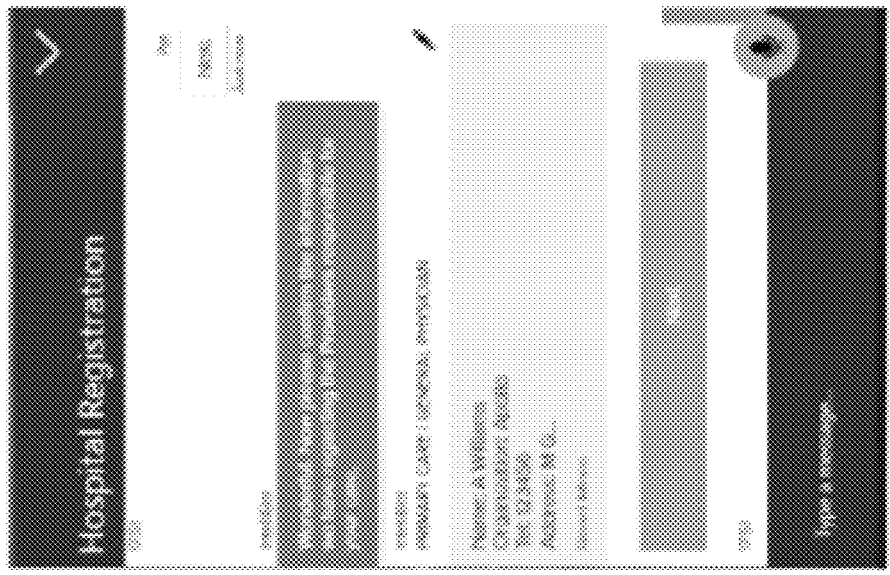
Figure 8F:
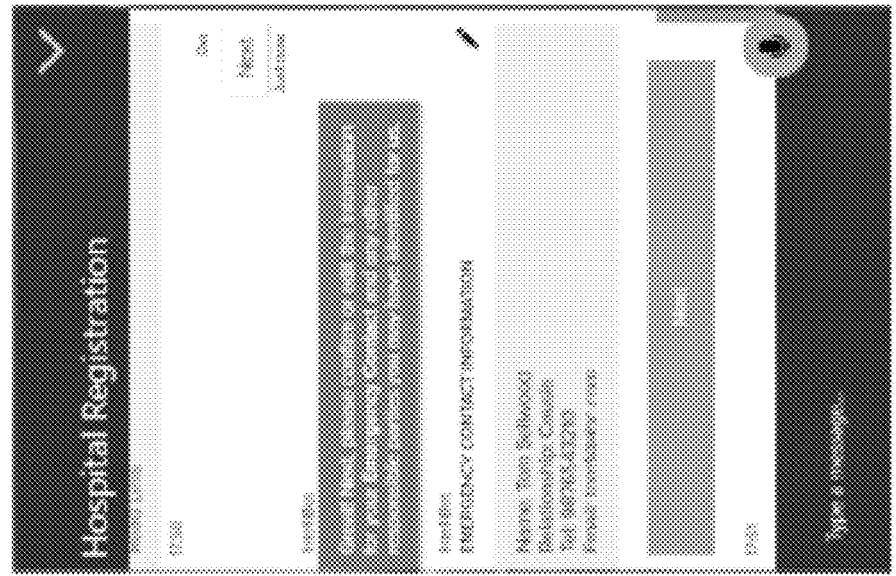
Figure 8I:
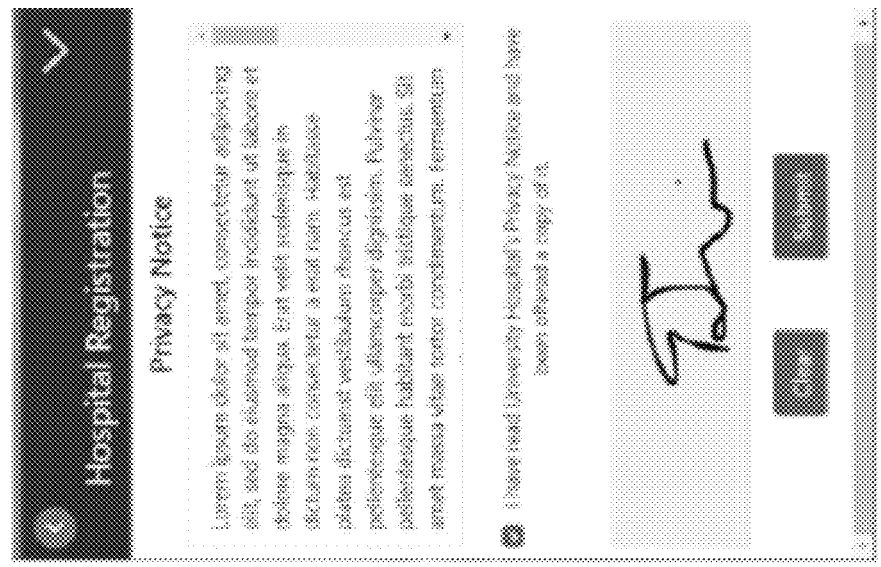
Figure 8H:
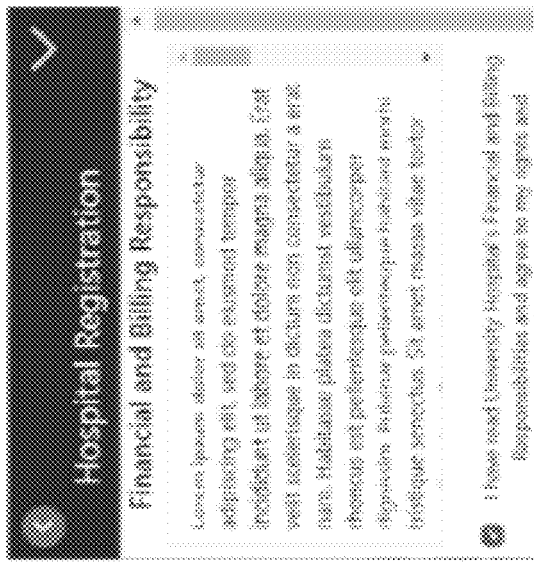
Figure 8G:
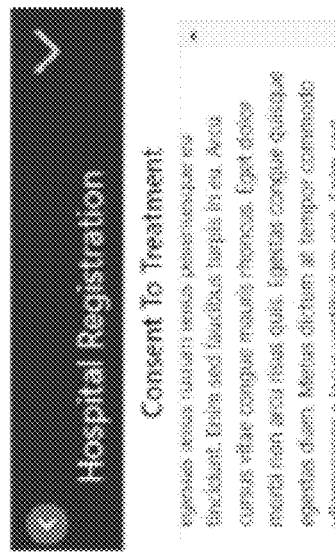
Figure 8L:
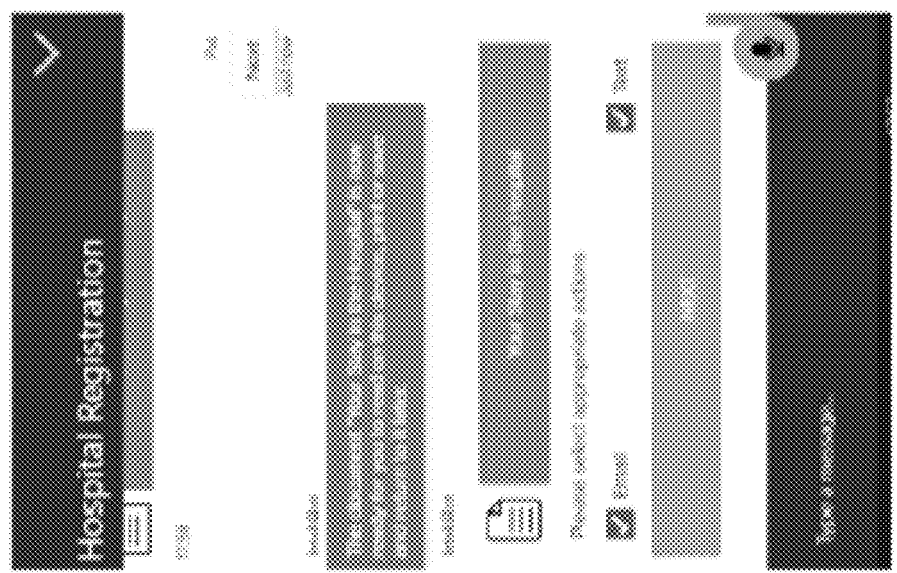
Figure 8K:
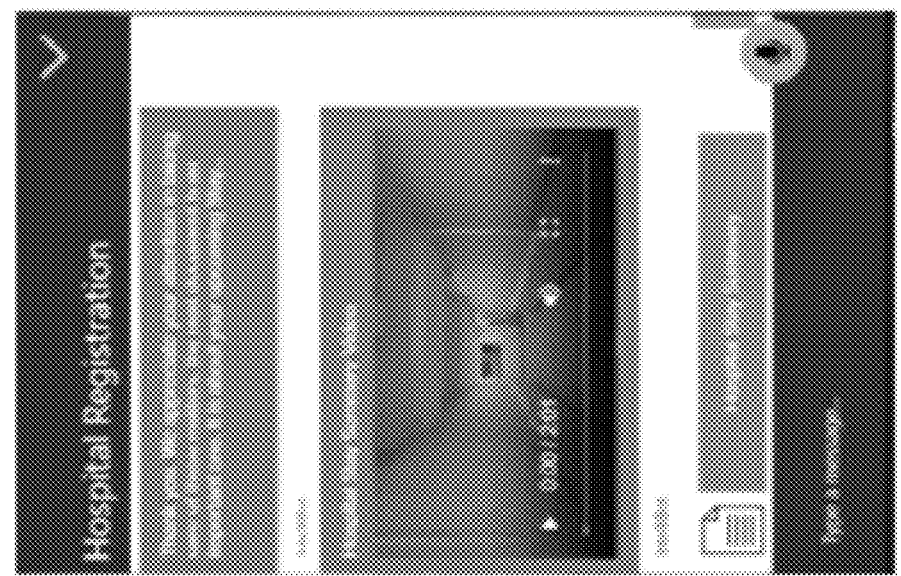
Figure 8J:
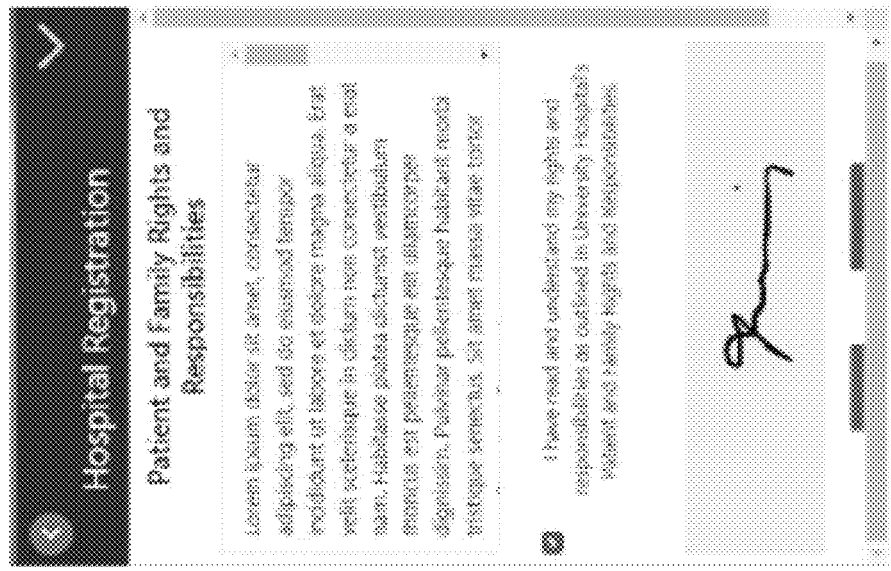
Figure 8N:
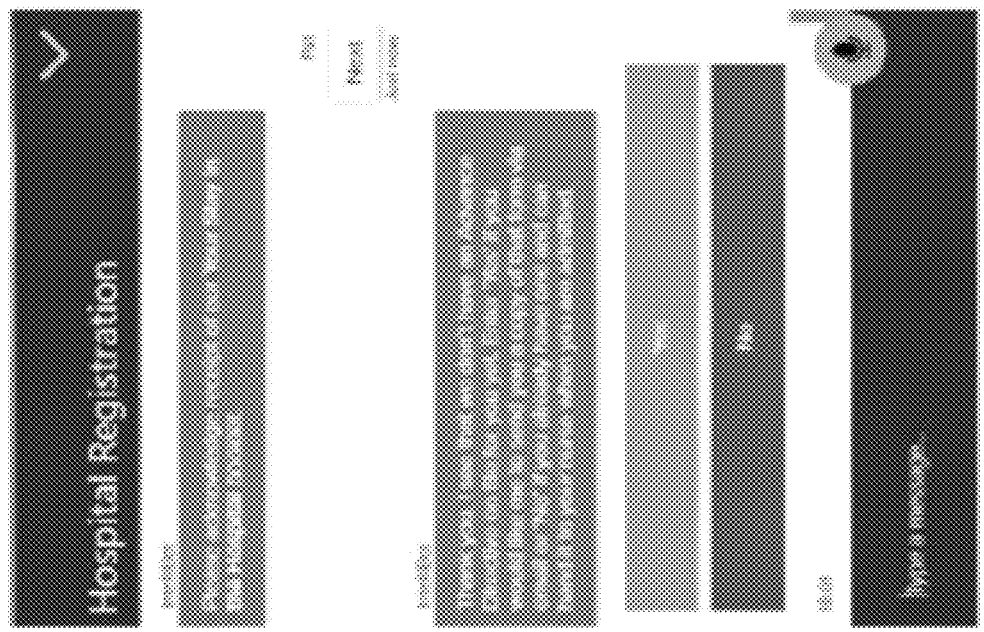
Figure 8M:
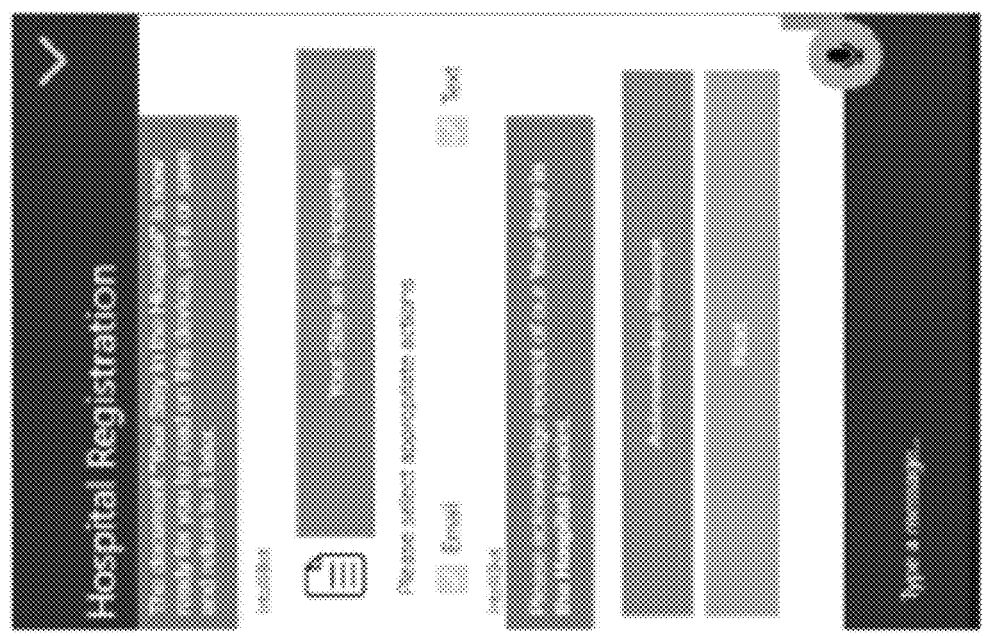
Figure 8P:
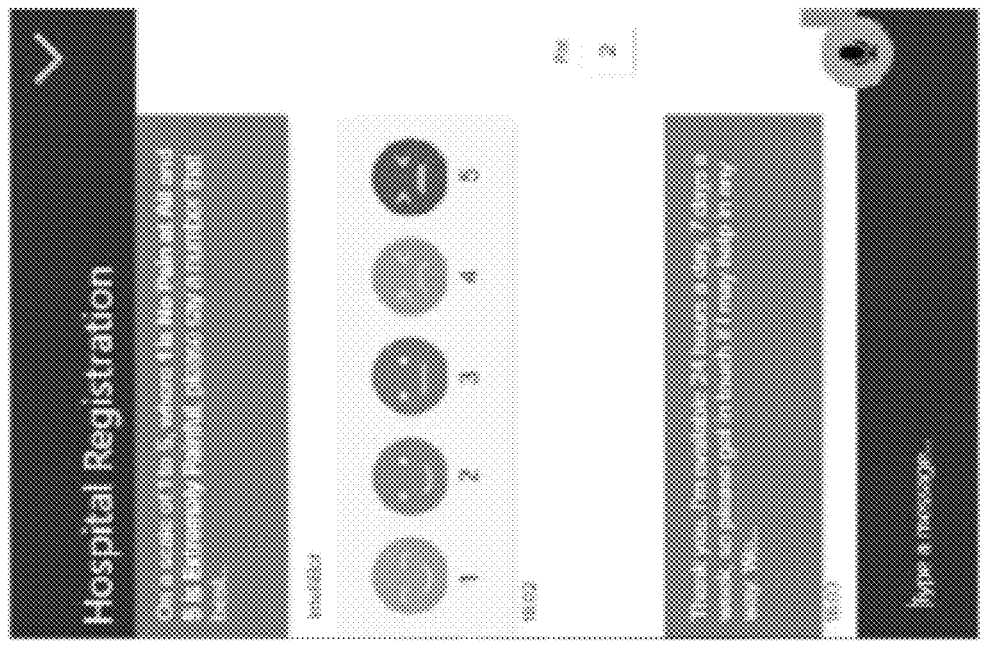
Figure 8O:
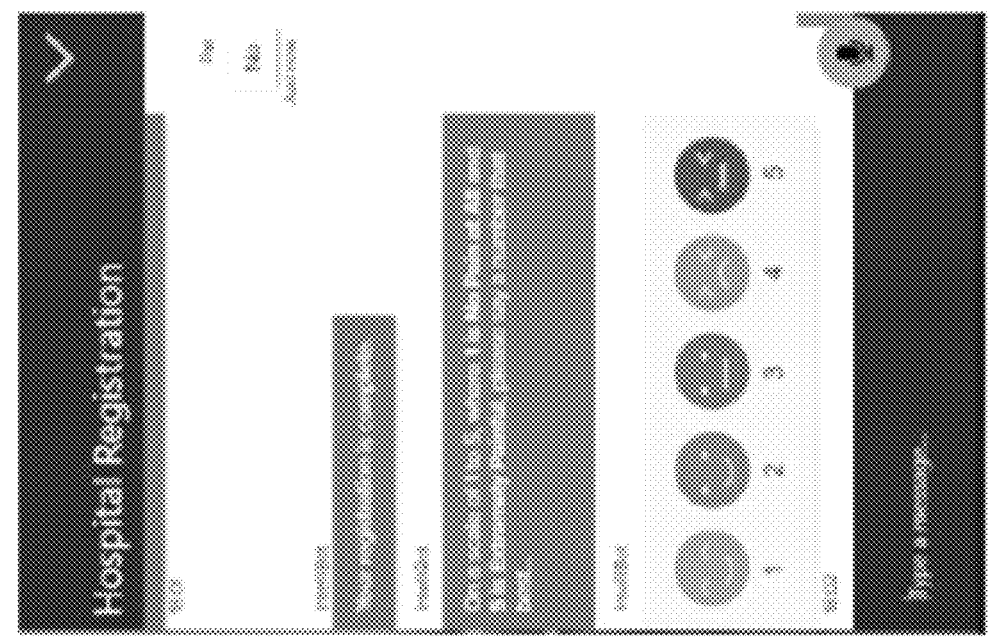
Figure 9C:
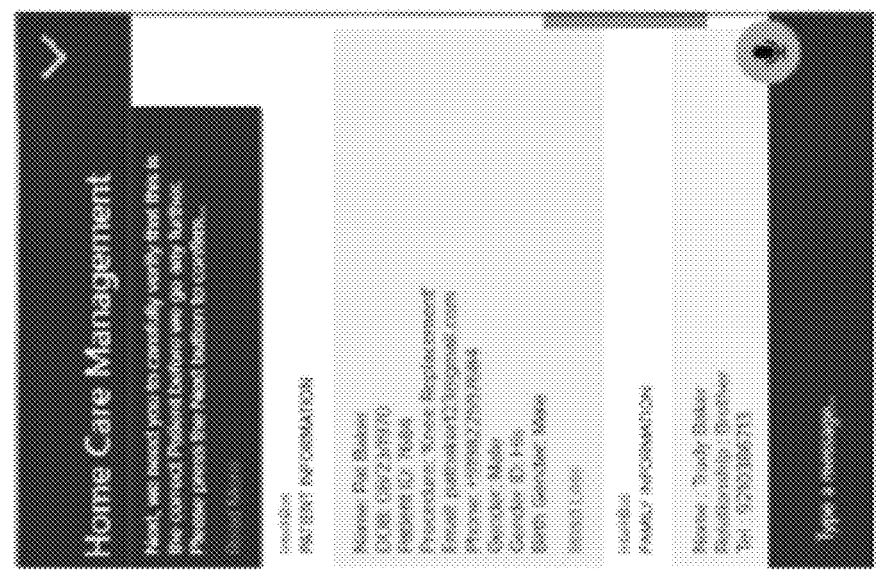
FIGS. 9A-F are screenshots showing, by way of example, communication between a chatbot and patient based on a home care management module.
Figure 9B:
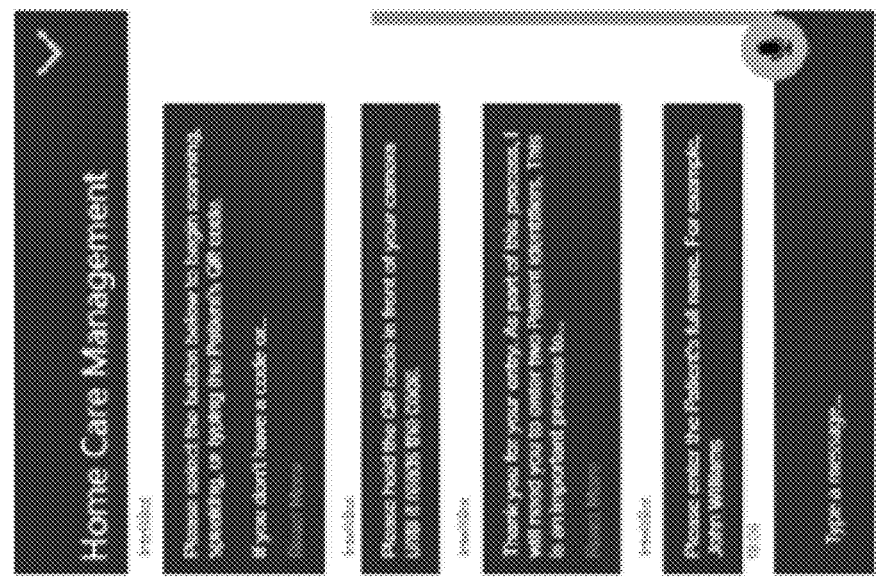
Figure 9A:
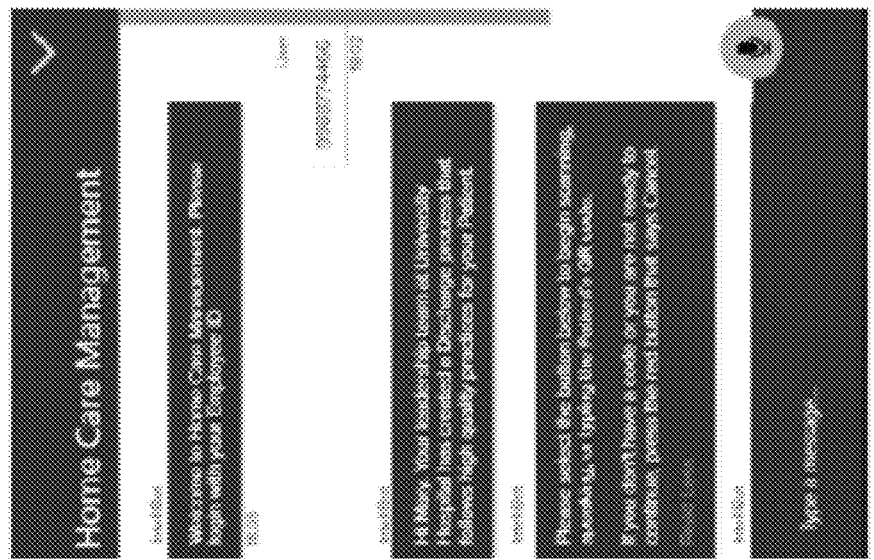
Figure 9F:
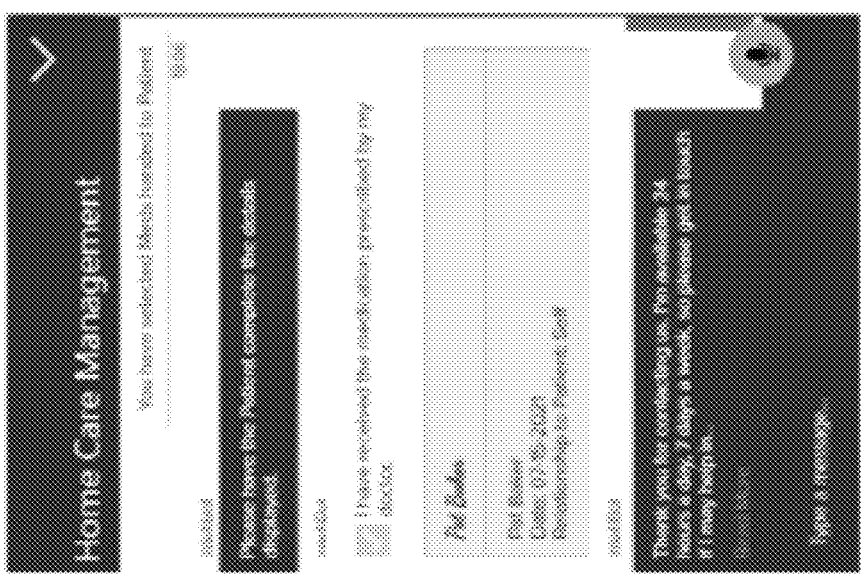
Figure 9E:
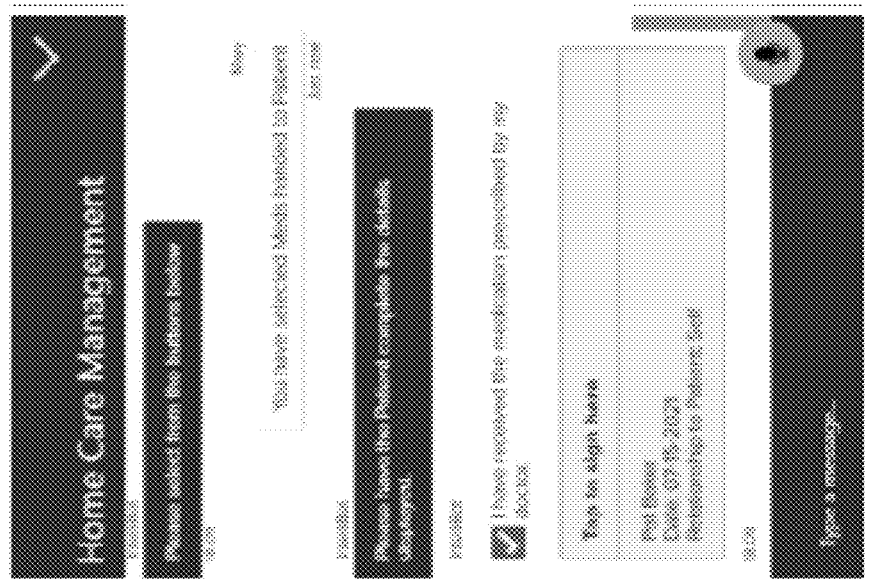
Figure 9D:
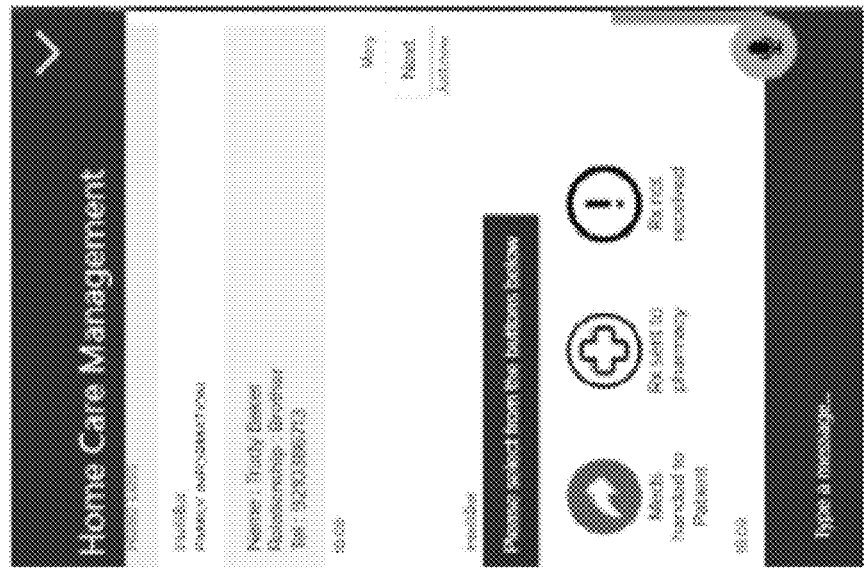
Figure 10A:
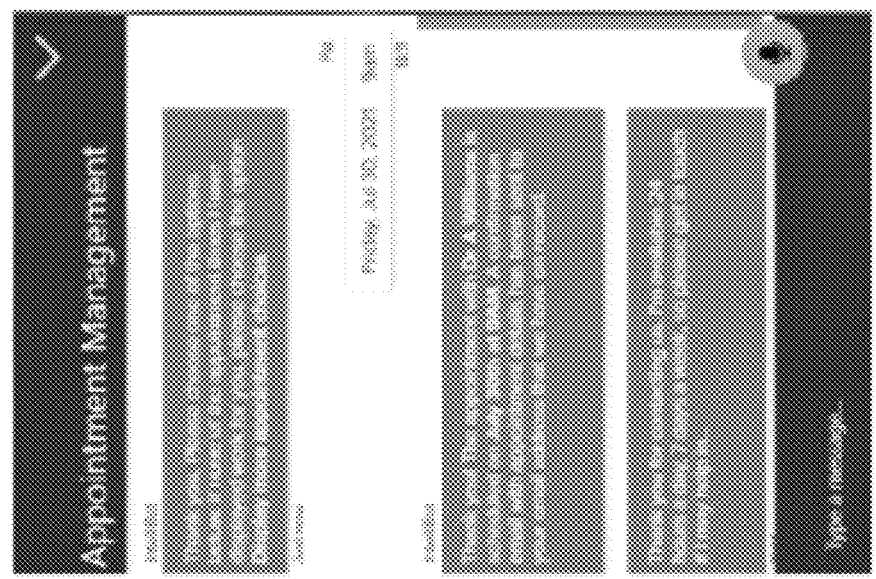
FIGS. 10A-C are screenshots showing, by way of example, communication between a chatbot and patient based on an appointment management module.
Figure 10B:
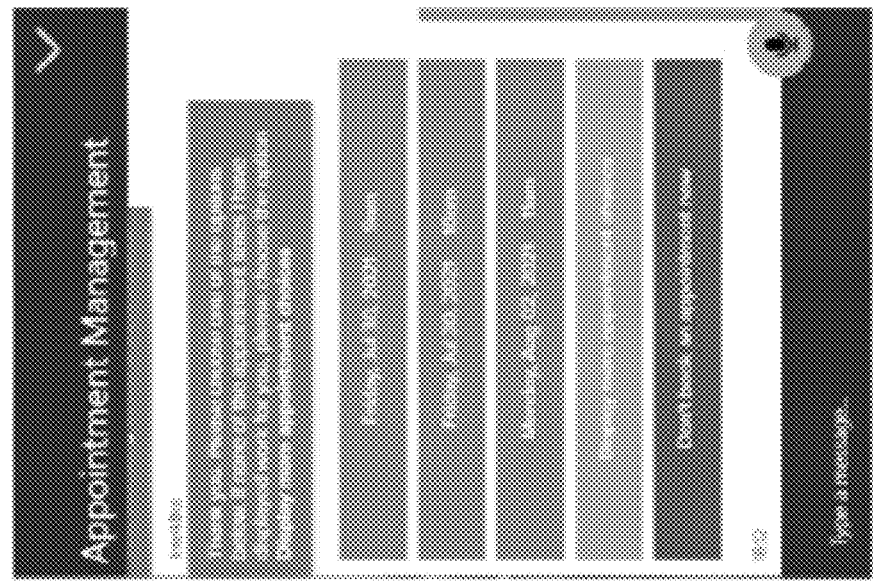
Figure 10C:
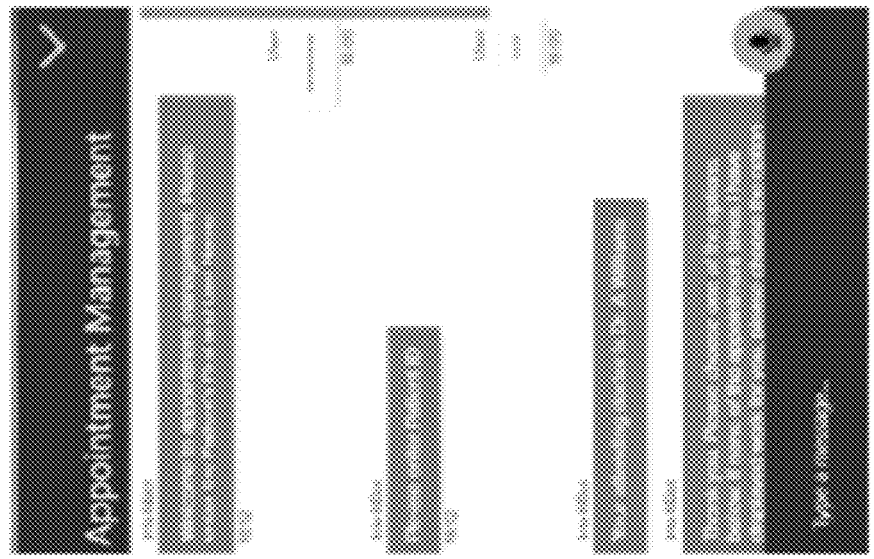
Figure 11A:
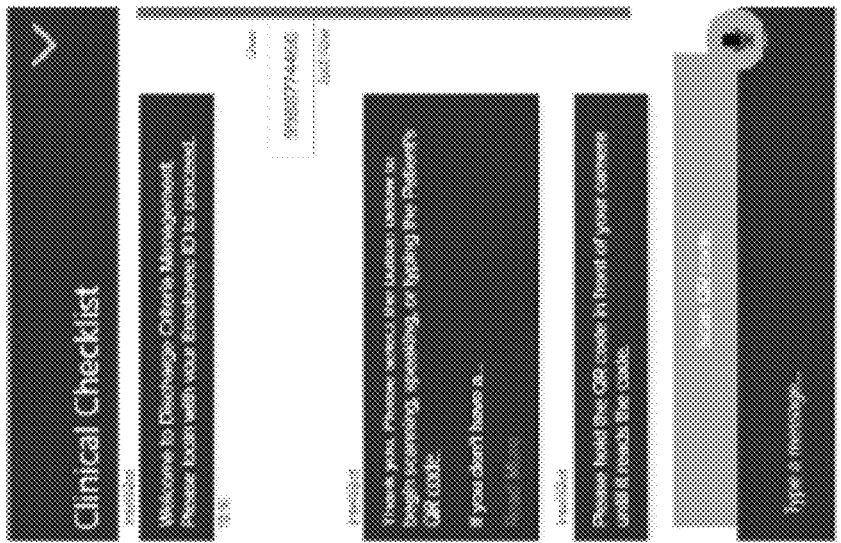
FIGS. 11A-V are screenshots showing, by way of example, communication between a chatbot and patient based on a clinical checklist module.
Figure 11B:
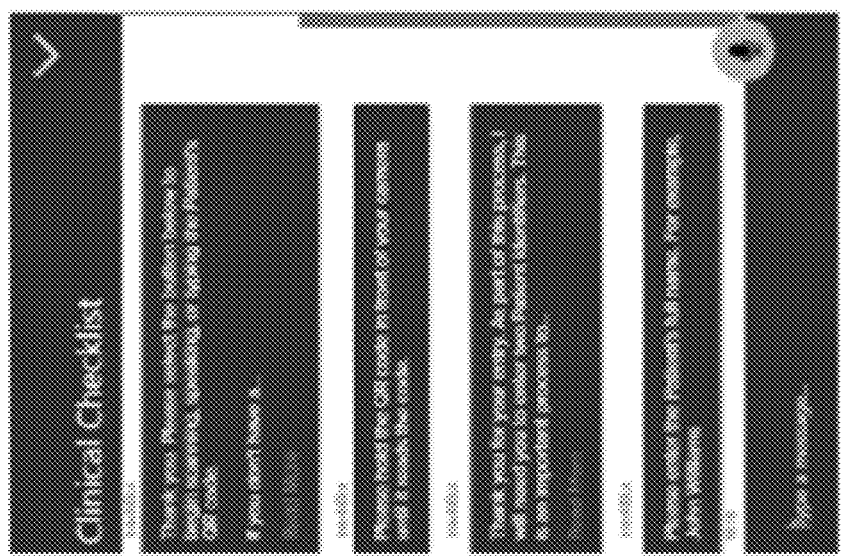
Figure 11C:
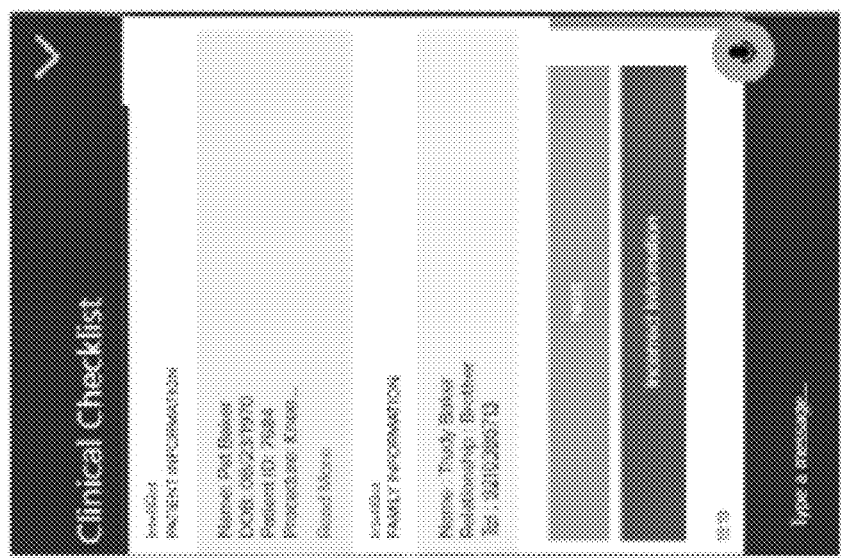
Figure 11D:
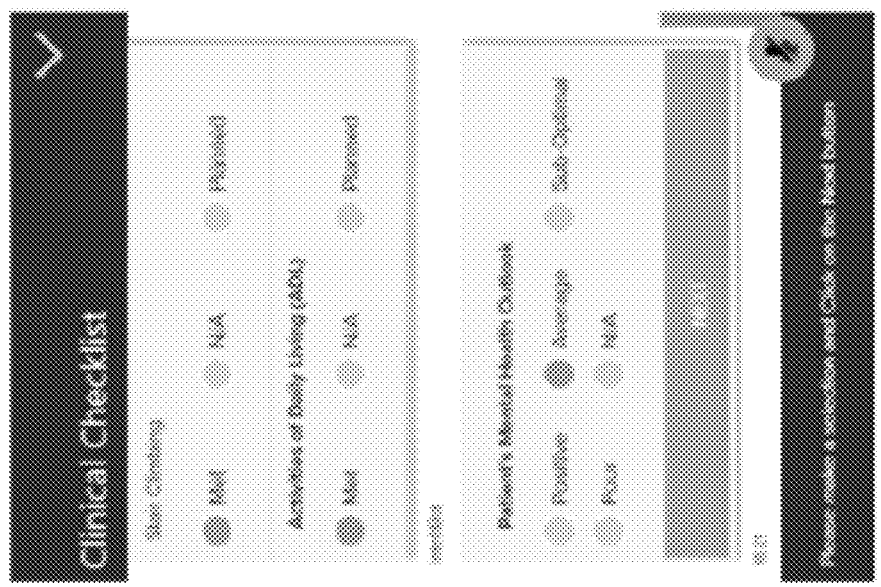
Figure 11E:
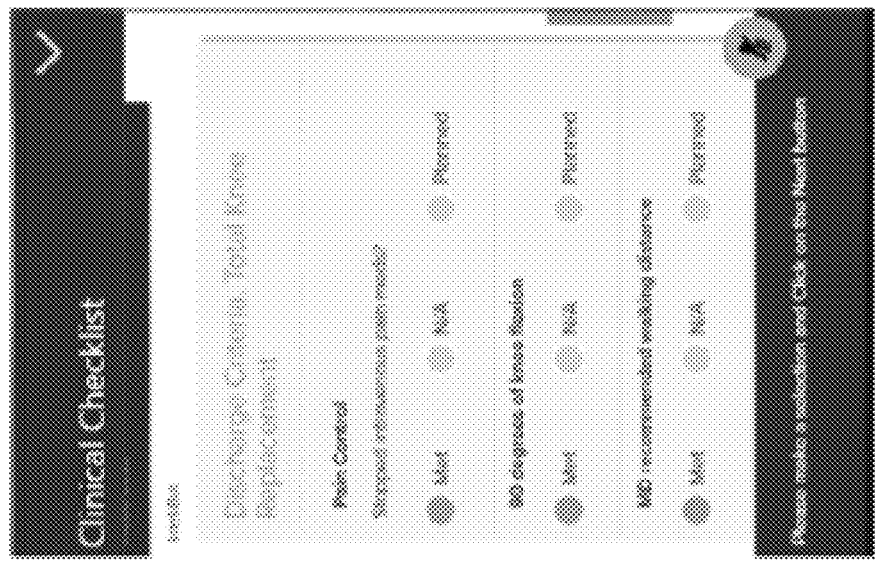
Figure 11F:
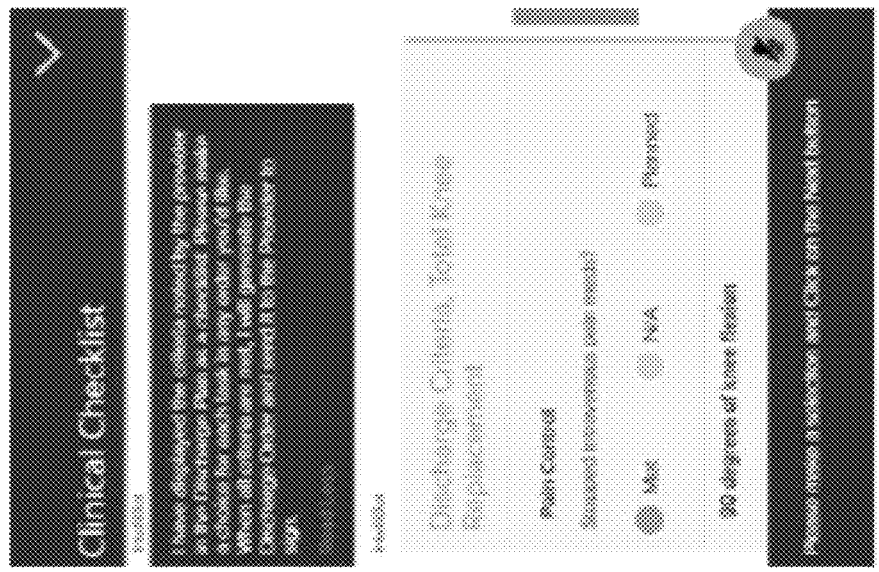
Figure 11I:
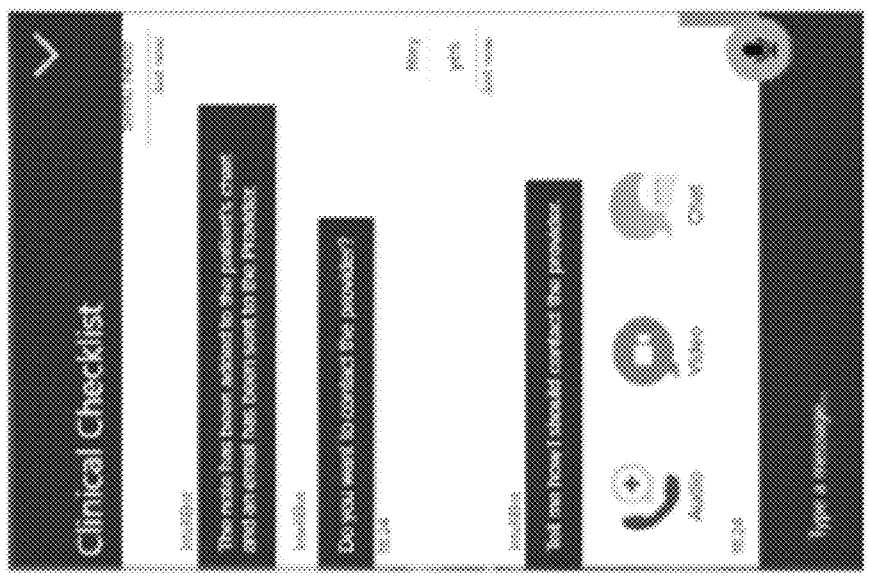
Figure 11H:
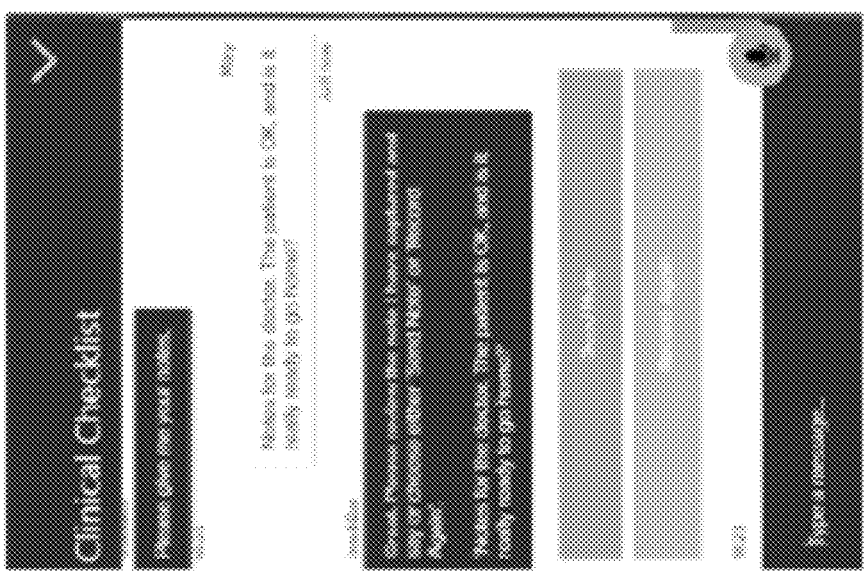
Figure 11G:
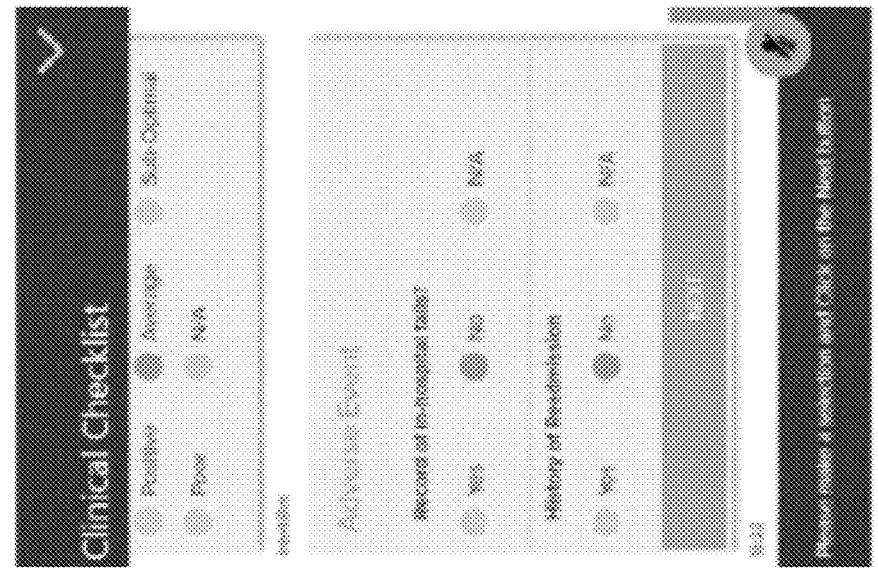
Figure 11L:
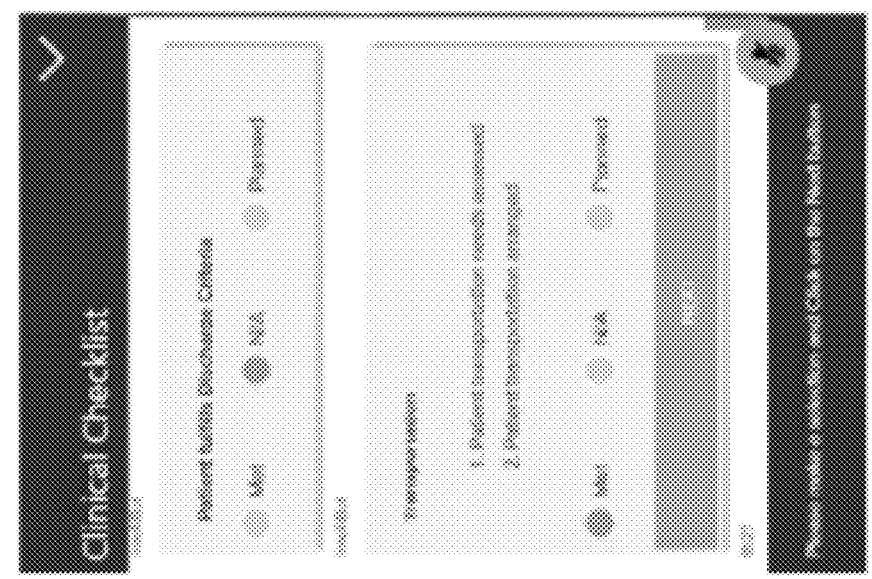
Figure 11K:
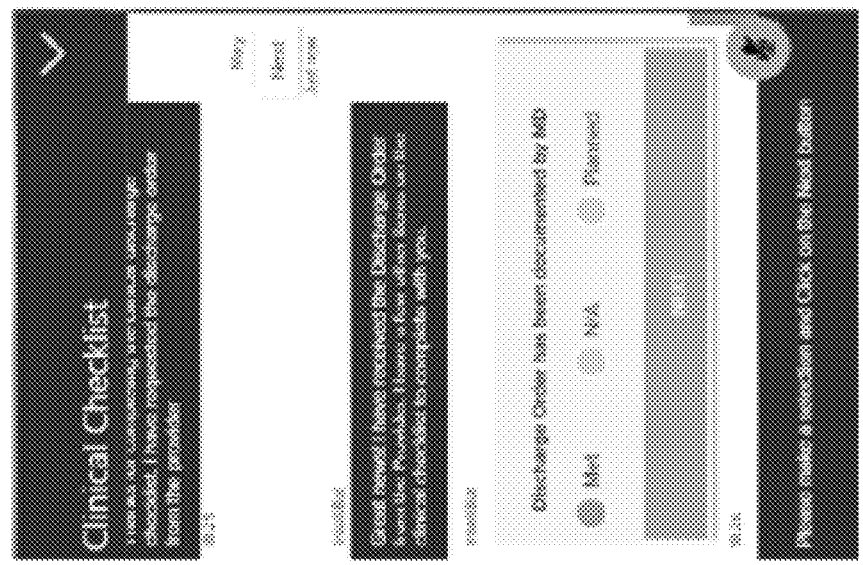
Figure 11J:
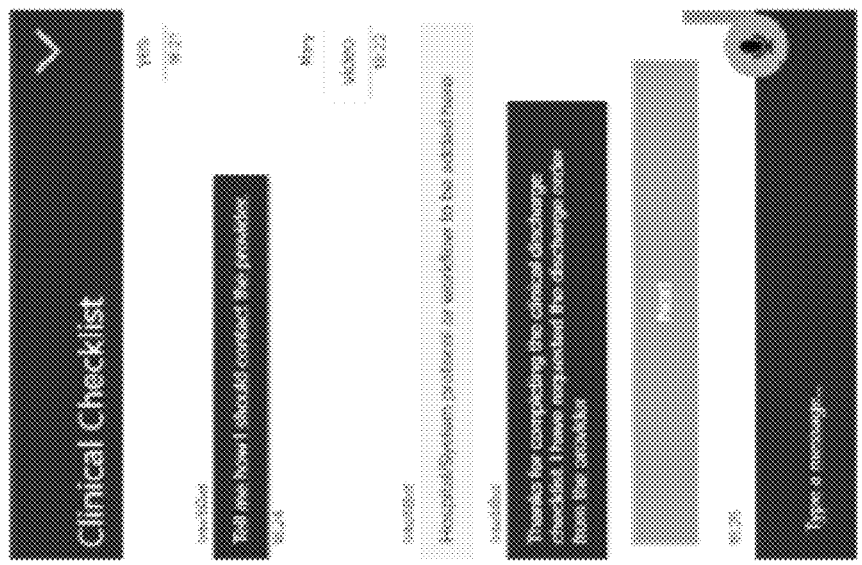
Figures 11M, 11N, 11O:
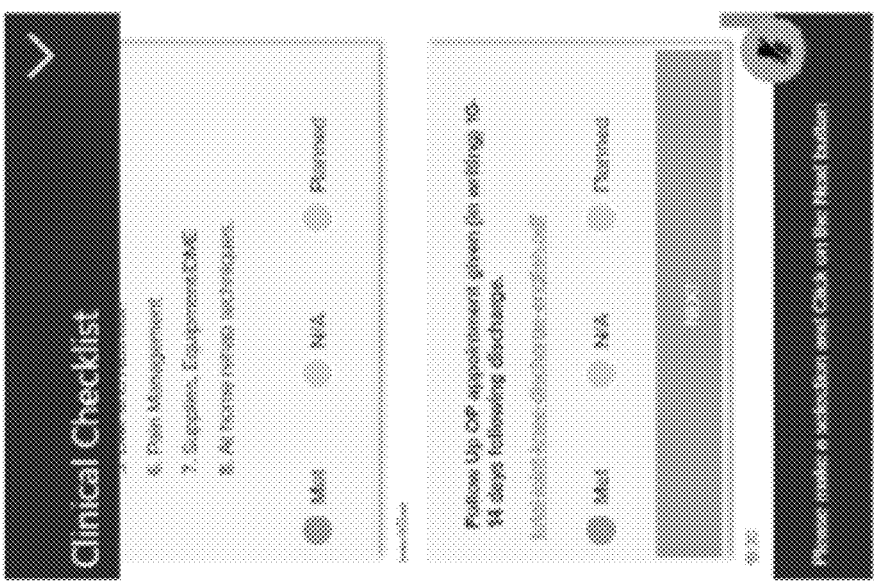
Figure 11T:
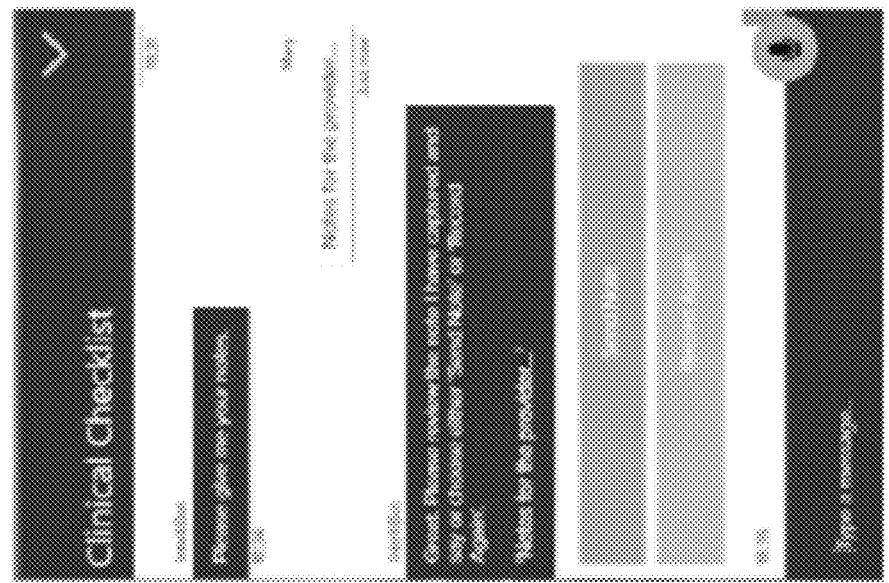
Figure 11S:
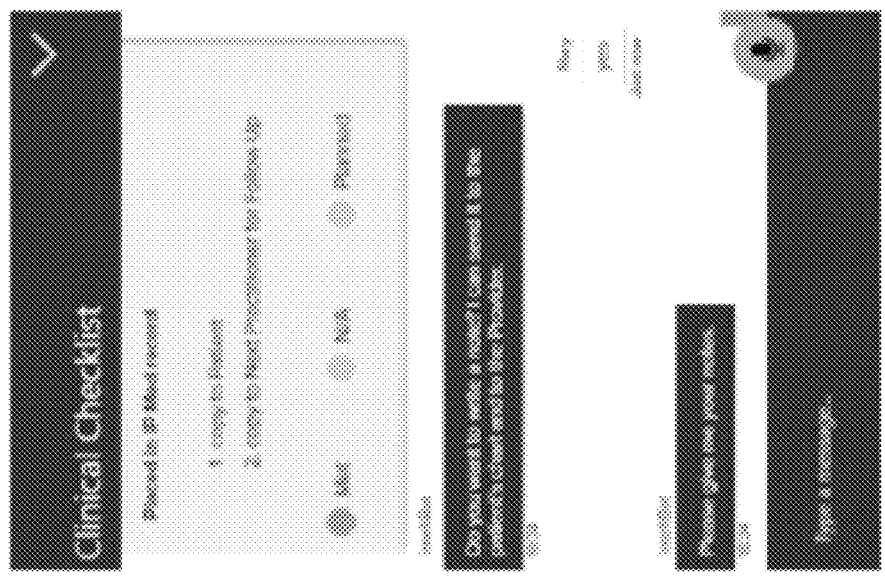
Figure 11V:
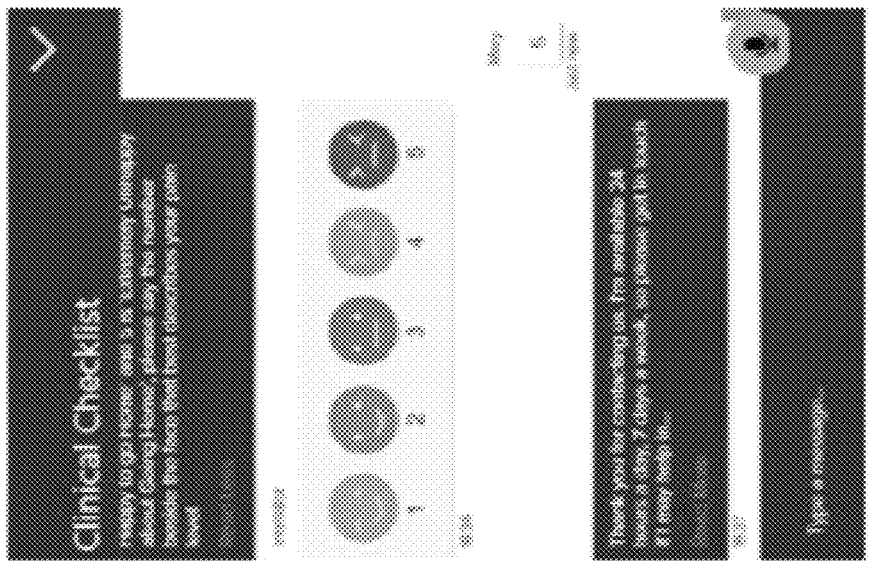
Figure 11U:
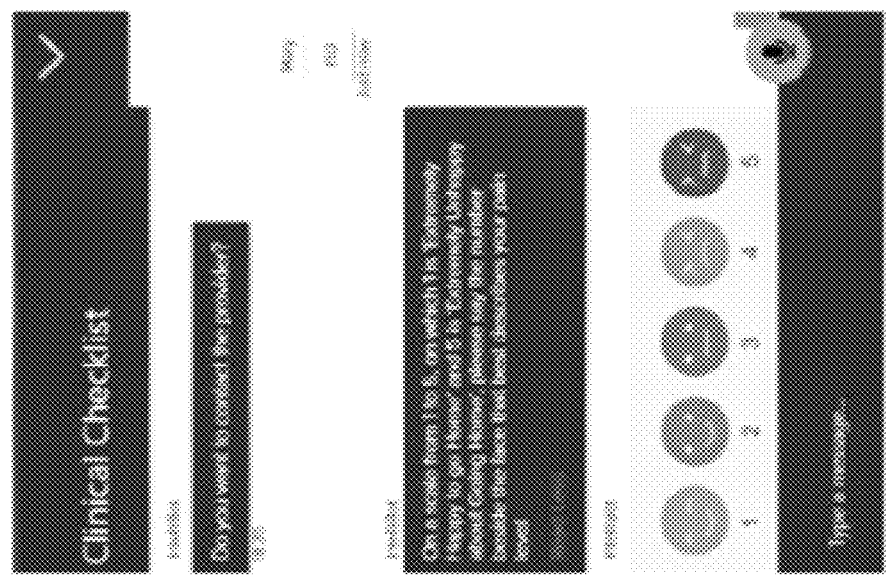
Figure 12A:
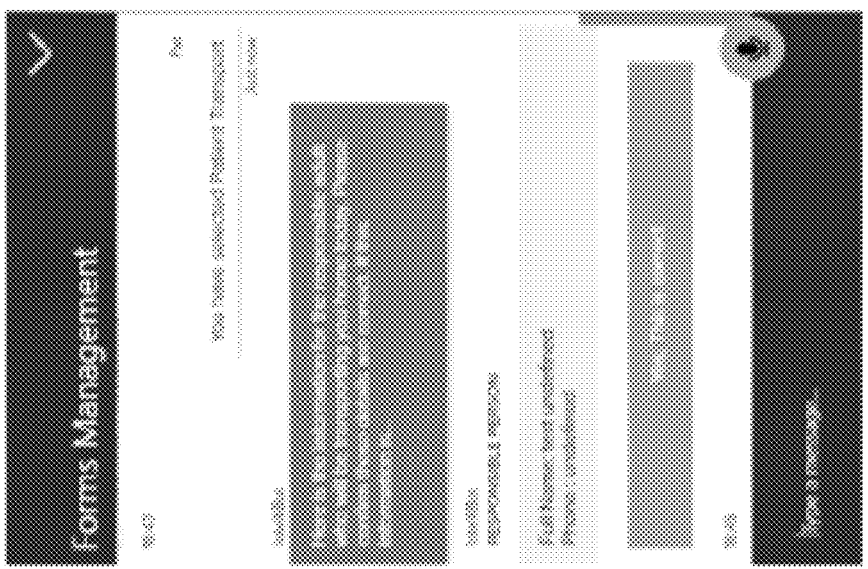
Figure 12B:
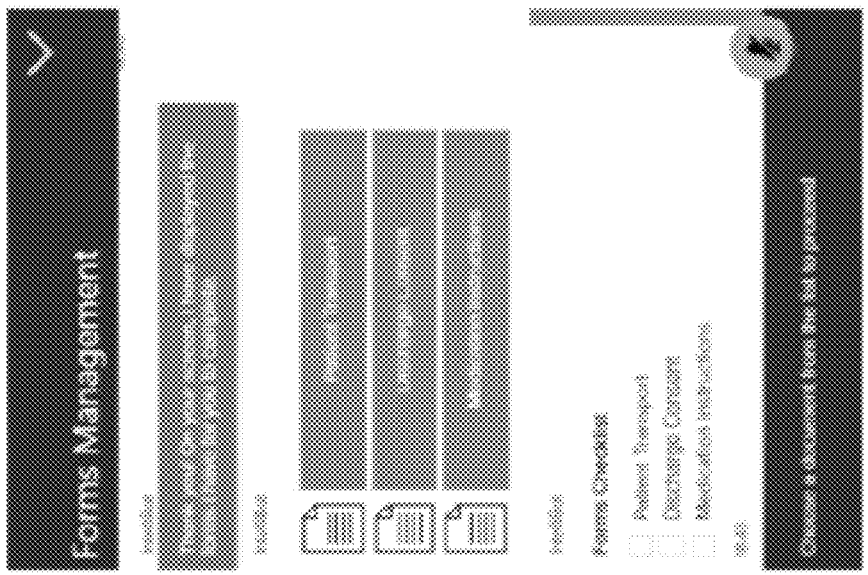
Figure 12C:
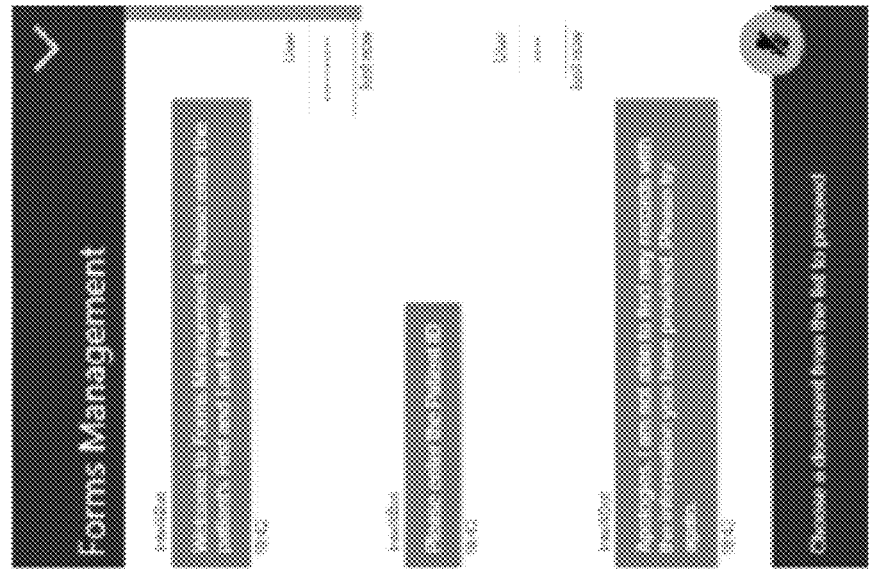
Figure 12F:
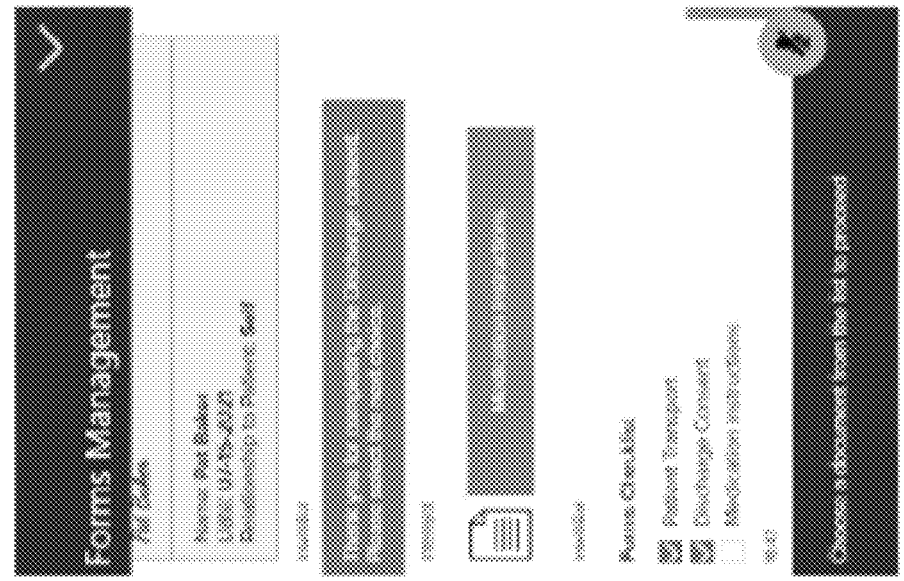
Figure 12E:
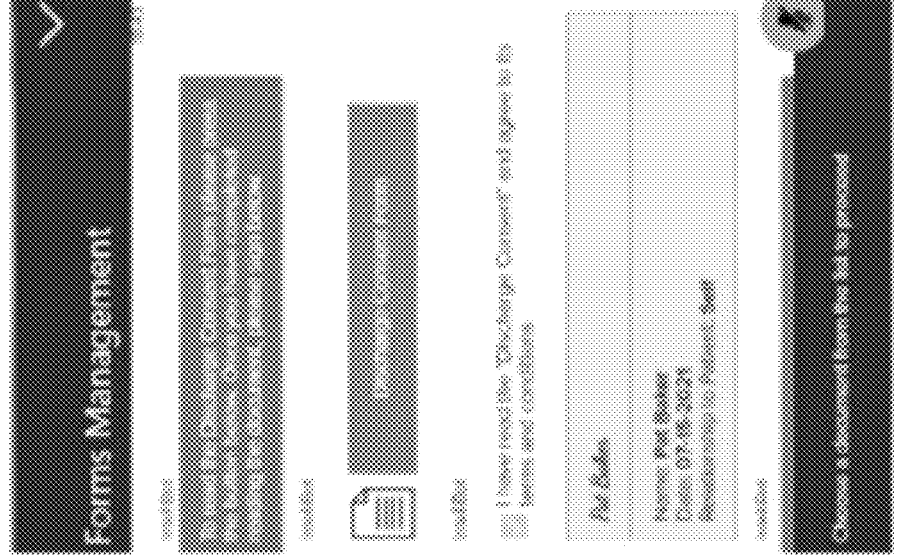
Figure 12D:
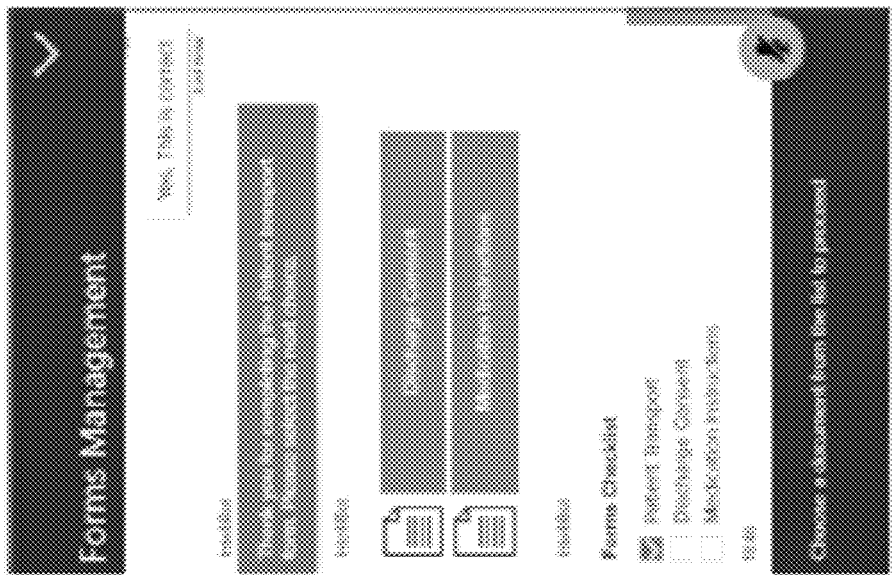

The data collected and analyzed for the audit can be collected via a chatbot utilizing one or more modules. Scripts of the modules can be provided to a patient via voice or text, examples of which are provided in the figures. FIGS. 7A-E are screenshots showing, by way of example, communication between a chatbot and patient based on a patient education module. FIGS. 8A-P are screenshots showing, by way of example, communication between a chatbot and patient based on a patient registration module. FIGS. 9A-F are screenshots showing, by way of example, communication between a chatbot and patient based on a home care management module. FIGS. 10A-C are screenshots showing, by way of example, communication between a chatbot and patient based on an appointment management module. FIGS. 11A-V are screenshots showing, by way of example, communication between a chatbot and patient based on a clinical checklist module. FIGS. 12A-I are screenshots showing, by way of example, communication between a chatbot and patient based on a patient education module.

While the invention has been particularly shown and described as referenced to the embodiments thereof, those skilled in the art will understand that the foregoing and other changes in form and detail may be made therein without departing from the spirit and scope of the invention.

What is claimed is:

1. A system for medical audit, comprising:
   a database to maintain modules each regarding a different patient stage, wherein each module is associated with a script or voice recording to address one of the patient stages;
   a tracking device or mobile computing device;
   a server comprising a central processing unit, memory, an input port to receive one or more of the modules from the database, and an output port, wherein the central processing unit is configured to activate a chatbot for performing the following:
   identify a location of the patient via the tracking device;
   determine the stage of the patient within a medical facility based on the location for the patient, a presence or absence of a medical record for the patient, and contents of the medical record, wherein each stage comprises a step in a workflow through which the patient advances in the medical facility during a visit;
   trigger selection of the script or audio recording associated with one of the modules for the patient based on the identified patient location and determined patient stage;
   run the scripts or voice recordings associated with the selected module via a chatbot, comprising:
   provide requests for information based on the selected module;
   receive information from the patient in response to the requests; and
   automatically enter the received information in the medical record for the patient;
   perform a real time audit of the patient's medical record based on the information received from the patient by checking the information for compliance with a set of standards selected for the information; and
   generate and transmit an alert to a medical professional or administrator that the information does not comply.

2. A system according to claim 1, wherein the central processing unit via the chatbot searches for a medical record for the patient and generates a new medical record when the medical record is not found.

3. A system according to claim 1, wherein each module is configured as software written around a set of procedures or standards.

4. A system according to claim 1, wherein the patient status can be determined based on at least one of a location of the patient and a medical record of the patient.

5. A system according to claim 4, wherein the central processing unit via the chatbot determines the location via one of a mobile computing device or a location tracking device.

6. A system according to claim 1, wherein the central processing unit via the chatbot determines an identity of the patient upon opening an application associated with the chatbot.

7. A system according to claim 1, wherein the chatbot communicates with the patient via text or audio.

8. A system according to claim 1, wherein the central processing unit via the chatbot places an identity of the patient on an audit compliance report when information requested from the patient is not received.

9. A system according to claim 1, wherein each module is configured as software written around a set of procedures or standards and the modules each comprise one of a registration module, admission module, discharge module, intensive care unit management, laboratory management, appointment scheduling, blood bank management, radiology management, bed management, patient education, medication management, and post visit patient management.

10. A method for medical audit, comprising:
    maintaining modules each regarding a different patient stage, wherein each module is associated with a script or voice recording to address one of the patient stages;
    activating a chatbot;
    determining stage of the patient within a medical facility based on a location of the patient in the medical facility, a presence or absence of a medical record for the patient, and contents of the medical record, wherein each stage comprises a step in a workflow through which the patient advances in the medical facility during a visit;
    triggering selection of the script or audio recording associated with one of the modules for the patient based on the identified patient location and determined patient stage;
    running the scripts or voice recordings associated with the selected module, comprising:
    providing requests for information based on the selected module;
    receiving information from the patient in response to the requests; and
    automatically entering the received information in the medical record for the patient;
    performing a real time audit of the patient's medical record based on the information received from the patient by checking the information for compliance with a set of standards selected for the information; and
    generating and transmitting an alert to a professional or administrator that the information does not comply.

11. A method according to claim 10, further comprising:
    searching for a medical record for the patient; and
    generating a new medical record when the medical record is not found.

12. A method according to claim 10, wherein each module is configured as software written around a set of procedures or standards.

13. A method according to claim 10, wherein the patient status can be determined based on at least one of a location of the patient and a medical record of the patient.

14. A method according to claim 13, further comprising:
    determining the location via one of a mobile computing device or a location tracking device.

15. A method according to claim 10, further comprising:
    determining an identity of the patient upon opening an application associated with the chatbot.

16. A method according to claim 10, wherein the chatbot communicates with the patient via text or audio.

17. A method according to claim 10, further comprising:
    placing an identity of the patient on an audit compliance report when information requested from the patient is not received.

18. A method according to claim 10, wherein the modules each comprise one of a registration module, admission module, discharge module, intensive care unit management, laboratory management, appointment scheduling, blood bank management, radiology management, bed management, patient education, medication management, and post visit patient management.

* * * * *